US010868751B2

(12) United States Patent
Shammari et al.

(10) Patent No.: US 10,868,751 B2
(45) Date of Patent: Dec. 15, 2020

(54) CONFIGURABLE SYSTEM FOR RESOLVING REQUESTS RECEIVED FROM MULTIPLE CLIENT DEVICES IN A NETWORK SYSTEM

(71) Applicant: Saudi Arabian Oil Company, Dhahran (SA)

(72) Inventors: Mohammad D. Shammari, Dhahran (SA); Adnan O. Haidar, Dhahran (SA); Abdullah A. Tamimi, Dhahran (SA); Sami H. Buri, Dhahran (SA); Hussain A. Hajjaj, Dhahran (SA); Mohammad A. Qahtani, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 17 days.

(21) Appl. No.: 16/263,277

(22) Filed: Jan. 31, 2019

(65) Prior Publication Data
US 2020/0252323 A1    Aug. 6, 2020

(51) Int. Cl.
*H04L 12/759* (2013.01)
*H04L 12/707* (2013.01)
*H04L 12/733* (2013.01)

(52) U.S. Cl.
CPC ............ *H04L 45/028* (2013.01); *H04L 45/20* (2013.01); *H04L 45/24* (2013.01)

(58) Field of Classification Search
CPC .................................................. H04L 45/028
See application file for complete search history.

(56) References Cited

U.S. PATENT DOCUMENTS

| 8,412,599 | B2 | 4/2013 | Saiu et al. |
| 8,725,548 | B2 | 5/2014 | Leitch et al. |
| 9,852,382 | B2 | 12/2017 | Rangaswamy et al. |
| 10,552,796 | B1 * | 2/2020 | Delacourt .............. G06Q 10/06 |
| 2004/0111430 | A1 | 6/2004 | Hertling et al. |
| 2009/0204897 | A1 | 8/2009 | Sogge et al. |
| 2012/0029804 | A1 | 2/2012 | White et al. |

(Continued)

FOREIGN PATENT DOCUMENTS

| EP | 2891986 A1 | 7/2015 |
| WO | 2006127135 A2 | 11/2006 |

OTHER PUBLICATIONS

International Search Report and Written Opinion in Corresponding International Patent Application No. PCT/US2020/015542 dated Apr. 30, 2020. 12 pages.

*Primary Examiner* — Kevin M Cunningham
(74) *Attorney, Agent, or Firm* — Leason Ellis LLP

(57) ABSTRACT

A system, a method, and a computer program for generating a dynamically configurable resolution route for transmitting a request object to one or more nodes in a network, comprising receiving a trigger signal from a first node, determining one or more destination nodes based on a resolution process, schema or scenario, determining a pathway to the one or more destination nodes, generating a resolution route for transmitting the request object in the network, iteratively transmitting the request object to the one or more destination nodes based on the resolution route, receiving a request object resolution signal from a final destination node, and transmitting the request object resolution signal to the first node based on the request object resolution signal.

18 Claims, 20 Drawing Sheets

(56) References Cited

U.S. PATENT DOCUMENTS

2013/0268936 A1* 10/2013 Hsu .................... G06Q 10/0633
                                                        718/102
2014/0089390 A1* 3/2014 Chandra ................. H04L 67/08
                                                        709/203
2016/0359724 A1 12/2016 Bent et al.

* cited by examiner

AAE Process 903 - Patent Application Request

⟨Q⟩ Authorities & Extensions   ⊞ WF Status Extensions   ⊞ Simulation Run   ⚙ File Manager   ⓘ Alerts

311

---

Process Definition & Master Details

| System | SAP Human Resources Syatem ▼ |
| Category | Assets ▼ |
| Criteria | |

⌘ Process Docs

Max Approval Hierarchy [ 12 Department ▼ ]

Proponent Org [ 3002106 ]

Technical Org [ 0 ]

☑ Send to Initiator Upon Trigger     ☐ Keep Duplicates W/Different Category

☐ Enable Change by Route List Agent  ☐ Financial Process    Currency [ ▶ ]

☐ Disable Change by Inserted Agents  ☐ Disable SoD Checks

☐ Enable Delegation

☐ Enable Delegation to non-CPH                Reminders & Escalation Procedures 📇

☐ Hide from ITHD Support List

✎                                              ⊞ Active Version [ 0 ]

Responsible Entity [                    ]

FIG. 5

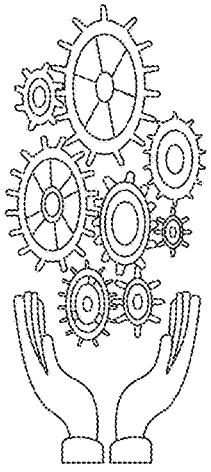

◎Model ⚙Simulate ⚙Execute
⚙ Optimize

ⓘ The Approval Authority Engine is a custom ERP Workflow Solution designed and developed to standardize and streamline approval tasks for corporate business processes.

AAE suports both financial and non-financial workflow for SAP non-SAP applications. The solution consists of several components and this Console is where business scenarios and their workflow schemas are configured.

Chekout our Sharek Page for more details:

🔍 AAE On Sharek Website

| | Search by Process ID | Search by Text |
|---|---|---|
| AAE Console-Automated Business Processes | Status | Alerts |

▽ ⓘ SAP Human Resources System
- ◎ Approval Authority Engine
- ◎ Authorization
- ◎ Business Intelligence
- ◎ Corporate Finance Management
- ◎ Customer Relationship Management (CRM)
- ◎ CSL Appointment
- ◎ Engineering
- ◎ Employee Services
- ◎ e-Services
  - ☐ 90-eZaji
  - ☐ 103-Summons
  - ☐ 229-Outgoing Government Correspondence Approval
  - ☐ 67-Application Approvals
  - ☐ 991-Corporate Correspondence ◇
  - ☐ 935-OTS Application Vulnerability Assessment ◇
- ◎ Integrated Planning Solution
- ◎ Industrial Security Services
- ◎ IT Services
- ◎ Land Affairs
- ◎ Network ID
- ◎ Non SAP Applications
- ◎ Organizational Management
- ◎ Personnel Development
- ◎ Personnel Management
- ◎ Payroll
- ◎ e-Recruitment
- ◎ Training and Event Management
- ◎ Time Management

- ☐ 90-SMP Timesheet Approval
- ☐ 203 Timesheet Approval
- ☐ 364-Approval of Vacation Deferral Legend
⚙ Application ☐ Business Process ⓧ Reusable Business Process

FIG. 6A

| Import New Process | | | | |
|---|---|---|---|---|
| Mobile-enabled | Criteria Structure | Business Category | Proponent Org Code | Support Team |

Business Applications

| | | | | |
|---|---|---|---|---|
| ZAAE_CS_EZAJIL | | Correspondence | Corporate Affairs Service Dept 30001574 | |
| ZAAE_CS_SUMMONS | | Correspondence | | |
| | | Correspondence | Corporate Affairs Service Dept 30001574 | |
| ZAAE_CS_ESV_SRS | | SRS | | |
| | | Correspondence | Corporate Affairs Service Dept 30001574 | |
| | | Workflow | Information Protection Dept 30001574 | |

Business Applications

| | | | |
|---|---|---|---|
| | | Supplement Manpower | HR Data Management Dvi(300003019) |
| ZAAE_CS_TIMESHEET | | Employee | Accounting Polices & System Dept(30001631) |
| ZAAE_CS_Variation Referral | | Departmental | HR Data Management Dvi(300003019) |

(Business Rule) ⚲ Mobile-enabled ◊ New ☐ Configured & Active △ Locked for change ⌀ Obselete 🗎 Alerts

FIG. 6B

Process Scenarios 313

| | Scenario Description | Scenario status | Change status |
|---|---|---|---|
| 2 | Data Owner Approval | | |
| 3 | Cost Sheet Department Approval | | |
| 4 | Cost Sheet General Manager Approval | | |
| 5 | Cost Sheet Admin Area Approval | | |
| 6 | Cost Sheet Business Line Approval | | |
| 7 | Cost Sheet SAO Approval | | |
| 8 | User's Supervisor Approval | | |
| 9 | User's Division Head Approval | | |
| 10 | User's Department Approval | | |
| 11 | User's General Manager Approval | | |
| 12 | User's Admin Area Approval | | |
| 13 | User's Business Line Approval | | |

FIG. 7

Cost Sheet Department Approval

_314_

Scenario Route List

| Level | Agent Category | Agent Description | Position (holder) | Position Group | Hierarchy based Rule |
|---|---|---|---|---|---|
| 1 | Reviewer | User CSL | | User CSL Dyna... | |
| 2 | Approver | Requester's Supervisor. | | | First available supervisor of Requestor |
| 3 | Approver | Group leader. | | | First available supervisor at (or above) hierarchy 2... |
| 4 | Approver | Segment head. | | | First available supervisor at (or above) hierarchy 2... |
| 5 | Approver | Unit head. | | | First available supervisor at (or above) hierarchy 1... |
| 6 | Approver | Section head. | | | First available supervisor at (or above) hierarchy 1... |
| 7 | Approver | Requester's Division Head. | | | First available supervisor at (or above) hierarchy 1... |
| 8 | Approver | Requester's Manager. | | | First available supervisor at (or above) hierarchy 1... |
| 9 | Concur | EDPD Customer Support. | | Customer sup... | |

REQUESTOR INFORMATION

REQUEST NUMBER:

REQUESTED NAME:

ORGANIZATION:

REQUEST BY:

REQUEST DETAILS

FIG. 9

Home
Guide & Contacts

Create
Create New Business Process

Activate Version
Submit Process Version

Manage Position Group
Maintain Members

4021

Create

☆ Create Business Process

Process Definition

Process Name : [ New Network Equipment Request ]
System : [ SAP Human Resources System ˅ ]
Remarks : [ ]

Process Details

Financial : ◯ OFF
Delegation : ◯ OFF
Maximum Agent Level : [ VP ]
Currency : [ ]

Delegation to non-chief
◯ OFF
Is business rule:
◯ NO

Application Area: [ Administration ˅ ]
Business Category: [ Assets ˅ ]

Controls:
Delegation is not allowed for this process.
Maximum Approval Level is a VP in this case

FIG. 12

Process Definition

| System | SAP Human Resources System ▼ |
|---|---|
| Process | 903 | New Network Equipment Request ▼ |
| Application | Approval Authority Engine ▼ |

Process Master

Process Policy

Category | Assets ▼

☑ Enable Delegation
☐ Enable Delegation to non-OPH
☐ Keep Duplicates w/Diffrent Category
☐ Financial Process
Currency ▼

Reminders & Escalation

|  | Days | Hrs | Mins |
|---|---|---|---|
| First WI reminder |  | 5 ▼ | 2 ▼ |
| Repeat every |  |  |  |

|  | Days | Hrs | Mins |
|---|---|---|---|
| Escalate WI after | 12 | ▼ |  |
| Cancel W/F after | 90 days |  |  |

☐ Disable Rejection Messages

Process Controls

Max Approval Hierarchy | 12 Department ▼

☑ Send to Initiator upon Trigger
☐ Enable Change by Route List Agents
☐ Disable Change by Inserted Agents
☐ Hide from ITHO Support List
☐ Disable SoD Checks Proponent Org | 30021206
Technical Org |

☐ Save

Function Builder: Display ZAAE_GEN_APPFORM_TEMPLATE

⇦ ⇨ | ❀ ⚙ @ 🖰 | ⬢ ⧉ / 🖳 ⬚ | 🖧 ⬚ ⬚ ⬚ ⬚ 🗗 Pattern  Pretty Printer  Function Module Documentation  Text elements Function module: ZAAE_GEN_APPFORM_TEMPLATE    Active Attributes / Import / Export / Changing / Tables / Exceptions / Source code

| Parameter Name | Typing | Associated Type | Optional | Short text | Long T... |
|---|---|---|---|---|---|
| E_GT_PDF_LINES | LIKE | TLINE | | SAPscript Text Lines | |

FIG. 16B

Function Builder: Display ZAAE_GEN_APPFORM_TEMPLATE

⇦ ⇨ | ❀ ⚙ @ 🖰 | ⬢ ⧉ / 🖳 ⬚ | 🖧 ⬚ ⬚ ⬚ ⬚ 🗗 Pattern  Pretty Printer  Function Module Documentation  Text elements Function module: ZAAE_GEN_APPFORM_TEMPLATE    Active Attributes / Import / Export / Changing / Tables / Exceptions / Source code

| Parameter Name | Typing | Associated Type | Pass By.. | Short text | Long T... |
|---|---|---|---|---|---|
| E_PDF_SIZE | Type | I | ☐ | | |
| E_URL | Type | STRING | ☐ | | |
| E_FORM_CODE | Type | ZAAE_FORM_CODE | | AAE: Form type | |

| Function Builder: Display ZAAE_GEN_APPFORM_TEMPLATE |
| --- |
| ⇦ ⇨ \| ✂ ⚙ @ 📋 \| 🖹 / 📋 ⇧ \| 🖺 🔍 \| 🔳 🔳 i 🔳 🔲 🔳 🔲 Pattern Pretty Printer Function Module Documentation \| Text elements |

| Function module | ZAAE_GEN_APPFORM_TEMPLATE | Active |
| --- | --- | --- |

Attributes / Import / Export / Changing / Tables / Exceptions / Source code

| Parameter Name | Typing | Associated Type | Pass By.. | Short text | Long T... |
| --- | --- | --- | --- | --- | --- |
| E_PDF_SIZE | Type | I | ☐ | | |
| E_URL | Type | STRING | ☐ | | |
| E_FORM_CODE | Type | ZAAE_FORM_CODE | | AAE: Form type | |

FIG. 16C

Review E-Leave approval for employee 00520706 with request 00005.00 — AAE Standard Toolbar

⟨Reviewed ⊘Reject 📄View Remark 📝Add Remark 🔗Route List 📎Attachment ❓Contact Process Support⟩ AAE Container e-Leave Request Approval Form

*Application-driven content PDF Form*

Employee Details

| Badge Number | 00520706 | Name | US Tax92 Annette Synchronization92 |
|---|---|---|---|
| Request Type | New | Request Number | 00005.00 |
| Request Status | Submitted | HR Service Center | Ras Tanura |
| Created By | T_HR_PB_ETK1 | Created On | 12/31/2018 |
| Org Unit | RT Elementary School | Payroll Area | US Dollar |

FIG. 17A

SAP User Access Requests

✓ Reviewed  ⊘ Reject  🗐 View Remark  🗐 Add Remark  🗐 Route List  📎 Attachment  ⓘ Contact Process Support

AAE Standard Toolbar
AAE Container

SAP DV & QA Systems Access Request

*Application-driven content*
*BSP Application*

Requestor Information

| Request Number | 10009787 | | |
|---|---|---|---|
| Requester Name | Ayman AAA-iSSR Albetairy (AAA_USER_01)-00223010 | Telephone | +966-13-8761262 |
| Organization | Dh Ind Sec Ops Shift #4 Unit(30001788) | Date | 10/31/2018 |
| Initiated By | Ayman AAA-iSSR Albetairy (AAA_USER_01) | Requester type | Employee |

▽ Request Details

Justification
regetrettrewrt

Requested DV & QA Systems

| System/Client | Description | Access Type | Start Date | End Date |
|---|---|---|---|---|
| DSC062 | PSC[Supply Network Collabor | Developer | 10/31/2018 | 12/31/9999 |

Approve TEST

⬚Approve ⬚Return ⬚View Remarks ⬚Add Remarks ⬚Route List ⬚Attachment

Application Emebeded Logic  [X]

? This is an application message

[Continue] [Help] [× Cancel]

FIG. 18B

Confirmation of Action

? Confirm Decision

[Yes] [No]

FIG. 18C

Approve TEST

⬚Approve ⬚Return ⬚View Remarks ⬚Add Remarks ⬚Route List ⬚Attachment ⬚Application Button ? Contact Process Support

CONFIGURABLE SYSTEM FOR RESOLVING REQUESTS RECEIVED FROM MULTIPLE CLIENT DEVICES IN A NETWORK SYSTEM

FIELD OF THE DISCLOSURE

The present disclosure relates to a system, method and computer program for receiving, processing, transmitting and resolving one or more request objects in a network system, including configurable workflow processing and resolution of a plurality of request objects received from client devices in the network system.

BACKGROUND OF THE DISCLOSURE

Software developers are increasingly being asked to provide information technology (IT) workflow management platforms that can handle large numbers of complex processes in user environments such as enterprise network systems. The IT workflow management platforms are frequently customized to specific user environments, industries, fields, businesses, departments, etc., and require the assistance and guidance of subject matter experts (SMEs) to build, implement and maintain the processes. These platforms have proven to be prohibitively expensive and time-consuming to create, develop, implement and maintain.

There exists a great unmet need for a request workflow processing system that can integrate with a user environment and provide a configurable technology solution that can process and resolve a plurality of request objects from client devices in a standardized and streamline fashion.

SUMMARY OF THE DISCLOSURE

The disclosure provides a novel configurable technology solution, including a method, a system, and a computer program for receiving a plurality of request objects from client devices and resolving the request objects. The disclosure provides a method for generating a dynamically configurable resolution route for transmitting a request object to one or more nodes in a network. The method comprises: receiving a trigger signal from a first node in the network, the trigger signal being indicative of a request object being generated at the first node; querying a database in response to the trigger signal, and based on the request object, to access a resolution process, a resolution schema and a resolution scenario; determining one or more destination nodes in the network based on the resolution process, resolution schema or resolution scenario; determining a pathway to the one or more destination nodes in the network based on the resolution process, resolution schema or resolution scenario; generating a resolution route for transmitting the request object in the network, the resolution route including the one or more destination nodes and the pathway to the one or more destination nodes; iteratively transmitting the request object to the one or more destination nodes in the network based on the resolution route; receiving a request object resolution signal from a final destination node in the resolution route; and transmitting the request object resolution signal to the first node based on the request object resolution signal.

The final destination node can be one of the one or more destination nodes.

The request object resolution signal can comprise a notification signal.

The request object resolution signal can comprise an approval of an action request, a denial of an action request, a cancellation of the action request, or a reinitiation of the request object.

The request object resolution signal can be transmitted via an application callback exit.

The rule scenario can be determined based on a resolution policy stored in the database.

The method can further comprise accessing a node determination rule, and dynamically evaluating the resolution route, including the one or more destination nodes and the pathway to the one or more destination nodes, in near-real-time based on the node determination rule.

The method in can further comprise modifying the one or more destination nodes or the pathway to the one or more destination nodes in the resolution route. The method can further comprise generating a destination node interface that includes a workflow inbox. The method can further comprise: grouping the request object with one or more additional request objects; generating a request object group that includes the request object and the one or more additional request objects based on the resolution rule; and rendering the request object group in the workflow inbox.

The destination node interface can comprise a graphic user interface that includes a dynamic filter and a global search engine.

The destination node interface can comprise a plurality of fields, including: a destination node add field that receives an instruction to add a destination node in the resolution route; a destination node escalation field that receives an instruction to escalate an authority level related to the one or more destination nodes in the resolution route; or a destination node replace field that receives an instruction to replace one of the one or more destination nodes in the resolution route with a new destination node.

According to an aspect of the disclosure, a system is provided that generates a dynamically configurable resolution route for transmitting a request object in a network. The system comprises: a network interface; a database that stores a resolution policy, a resolution process, a resolution schema, or resolution scenario; a request object resolution unit that: receives a trigger signal from a first node in the network, the trigger signal being indicative of a request object being generated at the first node; queries the database in response to the trigger signal; determines one or more destination nodes in the network based on the resolution process, resolution schema or resolution scenario; determines a pathway to the one or more destination nodes in the network; generates a resolution route for transmitting the request object in the network, the resolution route including the one or more destination nodes and the pathway to the one or more destination nodes; iteratively transmits the request object to the one or more destination nodes in the network based on the resolution route; receives a request object resolution signal from a final destination node in the resolution route; and transmits the request object resolution signal to the first node based on the request object resolution signal. The final destination node can be one of the one or more destination nodes.

The request object resolution unit can access a node determination rule and dynamically evaluates the resolution route, including the one or more destination nodes and the pathway to the one or more destination nodes, in near-real-time based on the node determination rule.

The request object resolution unit can modify the one or more destination nodes or the pathway to the one or more destination nodes in the resolution route.

The request object resolution unit can generate a destination node interface that includes a workflow inbox; group the request object with one or more additional request objects; generate a request object group that includes the request object and the one or more additional request objects based on the resolution rule; and/or render the request object group in the workflow inbox.

The request object resolution unit can include an application callback exit that embeds logic received from one of the one or more destination nodes.

The request object resolution signal can comprise: a notification signal, an approval of an action request, a denial of an action request, a cancellation of the action request, or a reinitiation of the request object.

According to a further aspect of the disclosure, a computer readable medium is provided that includes the computer program, which when executed by one or more computing devices, carries out steps of: receiving a trigger signal from a first node in the network, the trigger signal being indicative of a request object being generated at the first node; querying a database in response to the trigger signal, and based on the request object, to access a resolution process, a resolution schema and a resolution scenario; determining one or more destination nodes in the network based on the resolution process, resolution schema or resolution scenario; determining a pathway to the one or more destination nodes in the network based on the resolution process, resolution schema or resolution scenario; generating a resolution route for transmitting the request object in the network, the resolution route including the one or more destination nodes and the pathway to the one or more destination nodes; iteratively transmitting the request object to the one or more destination nodes in the network based on the resolution route; receiving a request object resolution signal from a final destination node in the resolution route; and transmitting the request object resolution signal to the first node based on the request object resolution signal.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWING FIGURES

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

Figure 2:
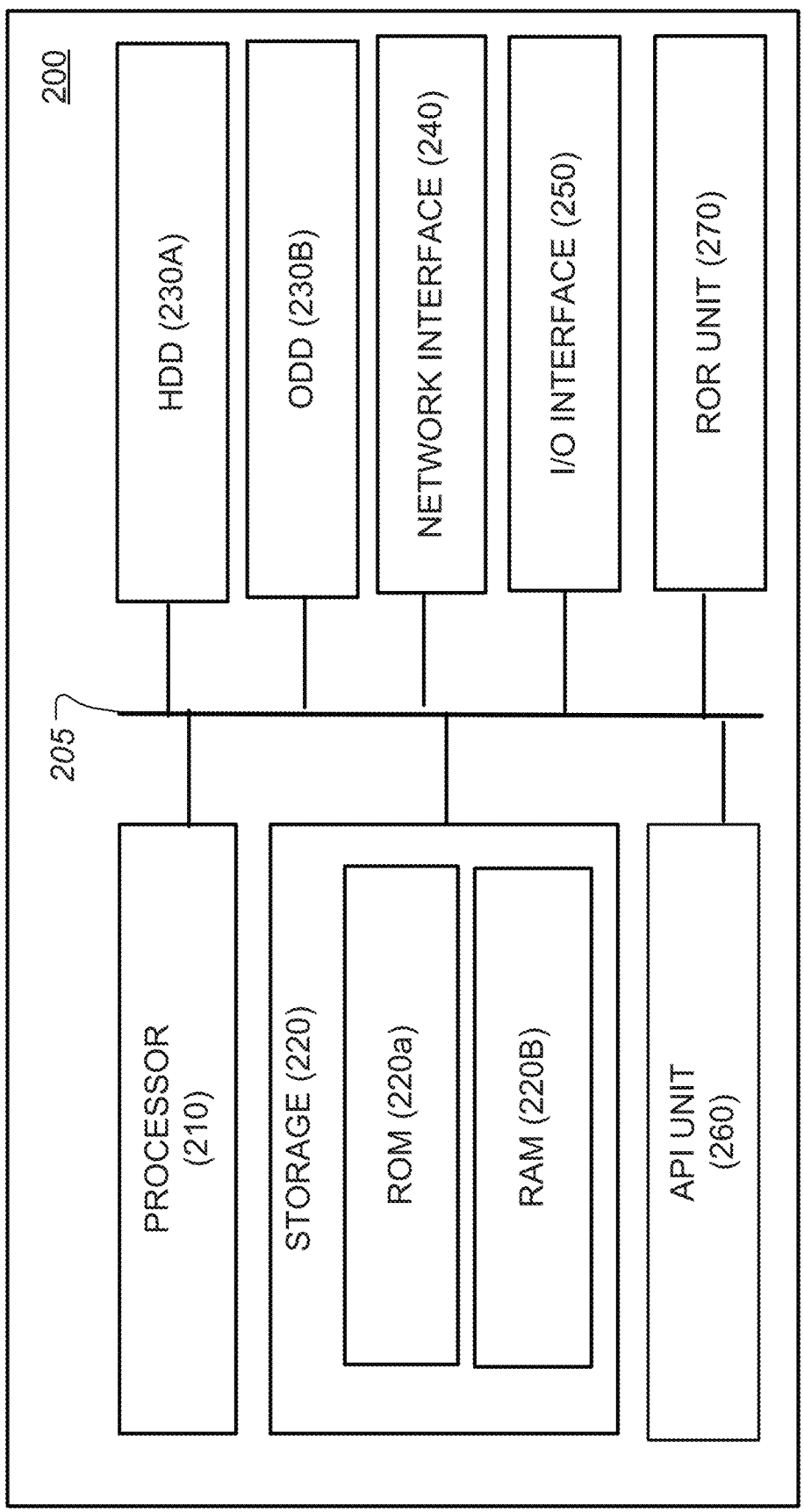
FIG. 2 shows an example of a processing unit that can be included in a request object resolution server in the user environment shown in FIG. 1.

FIGS. 5-10, 12-13, 16A-16C, 17A-17B, and 18A-18C show various examples of GUIs that can be generated by the processing unit in FIG. 2.

Figure 11:
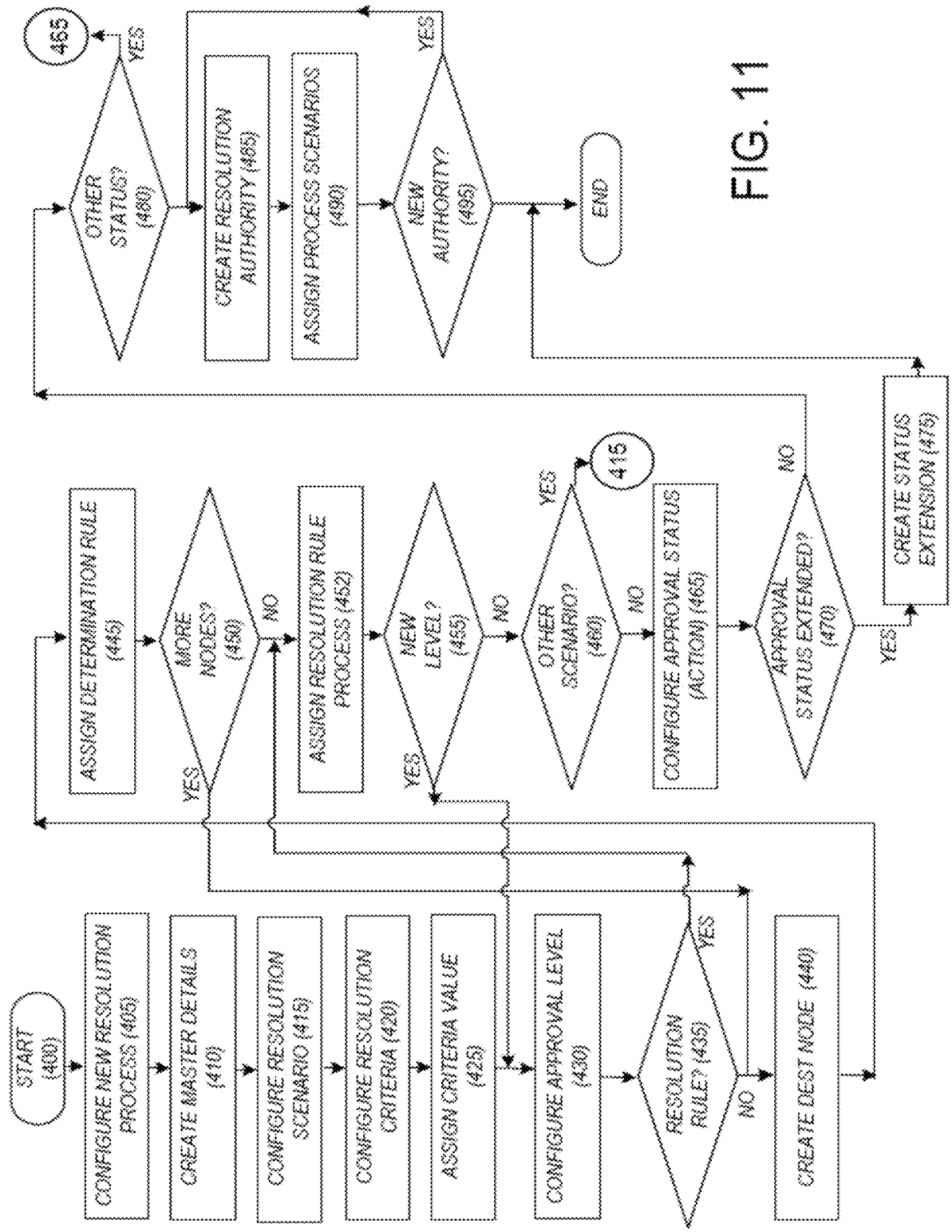

FIG. 11 shows an example of a configuration process that can be carried out by the processing unit in FIG. 2.

Figure 14:
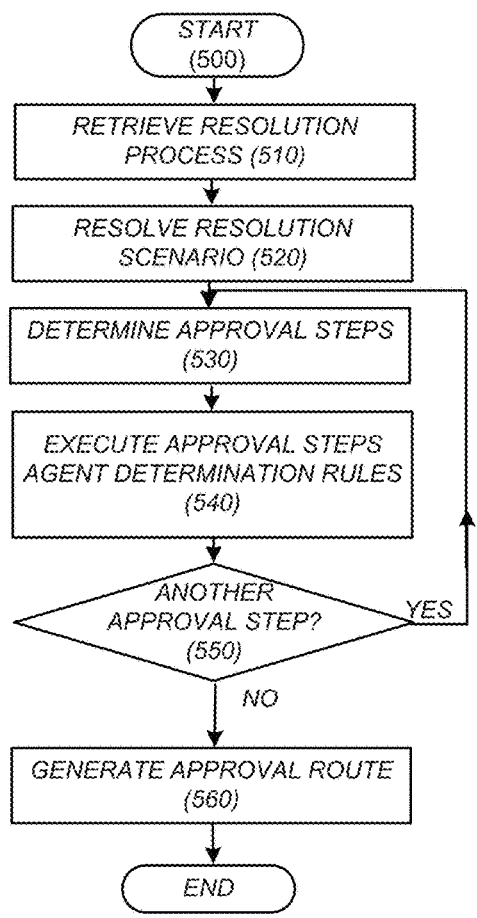

FIG. 14 shows an example of a resolution route generation process that can be carried out by the processing unit in FIG. 2.

Figure 15:
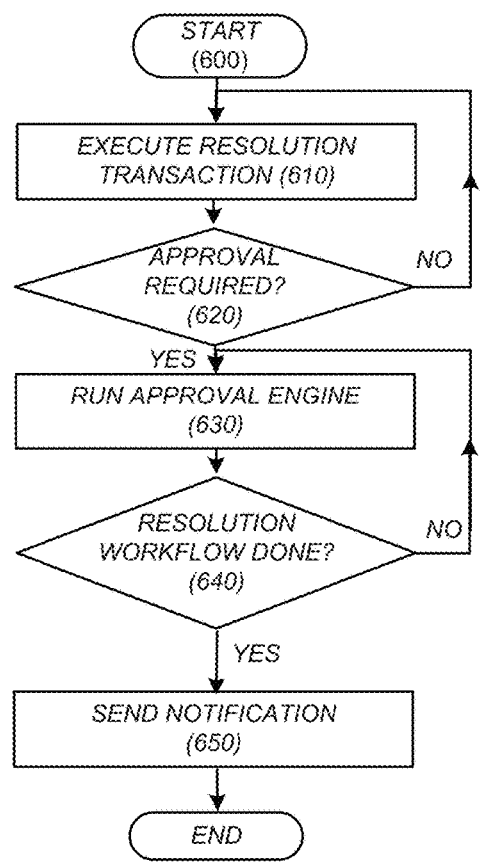

FIG. 15 shows an example of a notification process that carried out by the processing unit in FIG. 2.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those skilled in the art to practice the embodiments of the disclosure. Accordingly, the examples and embodiments herein should not be construed as limiting the scope of the disclosure. Moreover, it is noted that like reference numerals represent similar parts throughout the several views of the drawings.

The inventors have conceived and created a request resolution technology solution that provides a system, a method, and a computer program that can integrate with a user environment 100 (shown in FIG. 1) and provide a configurable technology solution that can process and resolve a plurality of request objects from one or more nodes in the user environment 100. Each request object can include a data package comprising multiple data packets that can be transmitted between two or more nodes across communication links in the user environment 100. The request object can comprise a header portion, a data portion, an agent portion, an attachment portion, and an action portion. The request object can be generated and displayed in an HTML, PDF, XML, or any other readily available format. The user environment 100 can include, for example, an enterprise network, a private network, a public network, or the Internet.

The header portion can include, for example, a source node identification (e.g., an IP address, an email address, a network address, a media access control (MAC) address, or other unique identifier), a member identification, a member name, a title, and/or a creation date and timestamp. The member identification can include, for example, an employee number, a social security number, a link to a database record, or any other identifier that can accurately identify a member who initiated the request object.

The data portion can include data that pertains to a particular request (such as, e.g., a workflow approval request), which can be highly variable. The data portion can include a title, a description of the request object, or a notation related to the request object, including any remarks or comments by the member who initiated the request object.

The agent portion can include one or more destination nodes (including, for example, an IP address, an email address, a network address, a MAC address, or other unique identifier for the destination node), an agent identification, an agent name, or any other identification that can be referenced by the resolution technology solution to accurately identify the agent or node. The agent portion can include one or more tags that can be checked to determine whether a particular destination node is to receive notices (e.g., periodic updates) related to the request object. A destination node can be provided by the source node (e.g., entered into a client device 10 by a member) or based on the source node (e.g., automatically provided based on the identity of the member or source node, such as, for example, a supervisor or network administrator).

The attachment portion can include a tag field (e.g., a TRUE/FALSE tag field), a record, a file, a link, a hyperlink, a pointer, or any other attachment or link to an attachment. For instance, if the tag field is "TRUE," then the attachment portion includes one or more attachments associate with the request object.

The action portion can include one or more actions that are to be carried out with respect to the request object. The actions can include, for example, approve/deny, review, comment, implement, etc.

The request resolution technology solution is designed to integrate with applications, such as, for example, enterprise applications in the user environment 100, and efficiently and effectively resolve request objects received from one or more nodes in the user environment. A request object can include a workflow approval request in an enterprise network. The technology solution can generate a resolution route and carryout out a workflow process for a request object according to the resolution route, including transmitting the request object to one or more appropriate nodes in the user environment 100, and returning a resolution result (e.g., an approval, a denial, a request for additional information, an abandonment, etc.) to the source node.

The request resolution technology solution can determine and create a dynamic resolution route for each received request object and continuously (or periodically) reevaluate the nodes and actions in the resolution route based on resolution rules and node determination rules (or agent determination rules). The technology solution can implement a resolution process, a resolution schema, or a resolution scenario derived based on one or more resolution polices to reevaluate and modify the resolution route. The request resolution technology solution is configurable and can ensure that an appropriate and current (e.g., in real-time or near real-time) resolution route is determined and maintained for each request object based on the relevant parameters set forth in the resolution policies, whereby the workflow for each request object is routed in the user environment 100 according to a dynamic (or "living") resolution route, which can be dynamically updated in real-time, including forwarding the request object to the appropriate node(s).

The request resolution technology solution can include an initiator cockpit (or source node interface) and/or an agent cockpit (or destination node interface), either or both of which can be generated and displayed at on one or more nodes in the user environment 100. The initiator cockpit can include a user interface (UI) such as, for example, a graphic user interface (GUI) that can be displayed on a client device to allow a member (e.g., an enterprise employee, a user, etc.) to create, submit, track or follow-up on one or more request objects (such as, for example, workflow approval requests), and to maintain a routing history of each submitted request object as permitted by the resolution policies.

The agent cockpit (or destination node interface) can include a UI, such as, for example, a GUI, that can be presented at a client device to allow an agent (e.g., an owner, a reviewer, an approver, an area manager, a decision maker, a supervisor, a department head, an administrator, a site administrator, a stakeholder, etc.) to review and implement a decision with respect to each of one or more request objects received from one or more source nodes. The agent cockpit can process a plurality of request objects received from one or more source nodes and render a request object group that allows an agent to apply a decision simultaneously to a grouping of request objects, which may have been grouped according to a predetermined category and displayed as one or more groups, allowing an agent to approve, reject, or apply a decision to an entire grouping of request objects at the same time.

The request resolution technology solution provided herein can provide many significant and important advantages and benefits to the user environment 100, including, for example, but not limited to: a centrally located application that can cater to systems, applications and products, including, for example, SAP and non-SAP automated processes; accelerated request order resolution implementations; handling all agent determinations during resolution processing; handling financial and non-financial approval processes; providing timely and relevant notifications, such as, emails indicating arrival, escalation, reminders, etc. for each request object; maintaining data integrity and audit history; providing for dynamic agent determination with other enterprise systems (such as, for example, human-resources systems), which can include referring to member lookup tables related to organizational hierarchies and positions and implementing the retrieved information to appropriately route request objects to appropriate client devices and associated members; systematic interpretation and implementation of resolution policies in accordance with resolutions processes; ensuring segregation of duties (SoD); reducing or eliminating training requirements for members or agents; and eliminating any need for SMEs to maintain the request resolution technology.

The request resolution technology solution can provide additional significant and important advantages and benefits to the user environment 100, including, for example: the capability to execute all request objects from an agent cockpit on a client device, which can include a workflow inbox; the ability to maintain a routing history for each request object, including decisions implemented for the request object along an entire transmission route for the request object, including, for example, insertion, escalation, replacement, etc.; ability to return request objects to previous levels or the client device associated with the requesting member; provisioning of client devices associated with agents with internal review capabilities; allowing for delegation of authority based on resolution policies; application exits that can allow applications to embed their own resolution logic; the ability to attach files and store and convey notations; allowing resolution of multiple request objects simultaneously; mobility functionality that allows for connection and provisioning of client devices that are external to the user environment 100, which can be connected, for example, via a virtual private network (VPN) over the Internet; simulation features that allow simulation of an request object route generation; utilizing existing data structure, such as the permanent, acting (substitute) and temporary assignments that might be located in enterprise networks such as, for example, databases associated with human resources departments; and, utilizing custom info types to identify and implement enterprise organizational structure based on, for example, an object model.

The request resolution technology solution can leverage an object (such as, for example, financial objects) and use its attributes and changes to derive resolution polices (e.g., workflow policies) and behavior to enable finer-grained resolution routing, including dynamically inferring resolution requirements. The technology solution can generate a generic template with built-in and configurable node determination rules to enable workflows to be quickly used in determining approval steps in a resolution route in any resolution process in a user environment, without the need for a technical SME. The template can be identified by an alphanumeric identifier such as, for example, a multi-digit/character (e.g., 10 digits) identifier ("Process ID"). The template can be stored locally or remotely.

The technology solution can include a meta-model for the skeletal architecture of a resolution process (e.g., a workflow process). The technology solution allows de-coupling of the resolution process (or workflow process) from an enterprise (e.g., a business) by creating and customizing resolution processes (or workflows) to fit any enterprise process (or business process) without any specialized integrated development or design tools. The meta-model can: employ one or more agent determination rules that might be needed for a modeled scenario; dynamically change these agents as the scenario changes in the processing of the resolution process (or workflow); and integrate objects, such as financial object, including implicit characteristics or requirements into the resolution process (or workflow).

The technology solution can model resolution policies to assign approval thresholds. Member or agent attributes (e.g., organization hierarchy, assigned roles, etc.) and resolution rules (e.g., corporate financial requirements) can be used to determine thresholds for request object approvals. Resolution rules can be linked to, for example, a financial object, to allow for complex processing of monetary-based object or authorizations based on predetermined conditions. The technology solution can dynamically reevaluate the resolution route for a request object and update the resolution route, including nodes, actions, etc., based on, for example, resolution rules, node determination rules, and the like. The technology solution can apply agent-determination rules and controlled delegations against the resolution route to ensure timely and accurate transmission of a request object to the correct node every time, which can be done at runtime without pre-specifying the resolution route, or re-initiating a new workflow.

Figure 1:
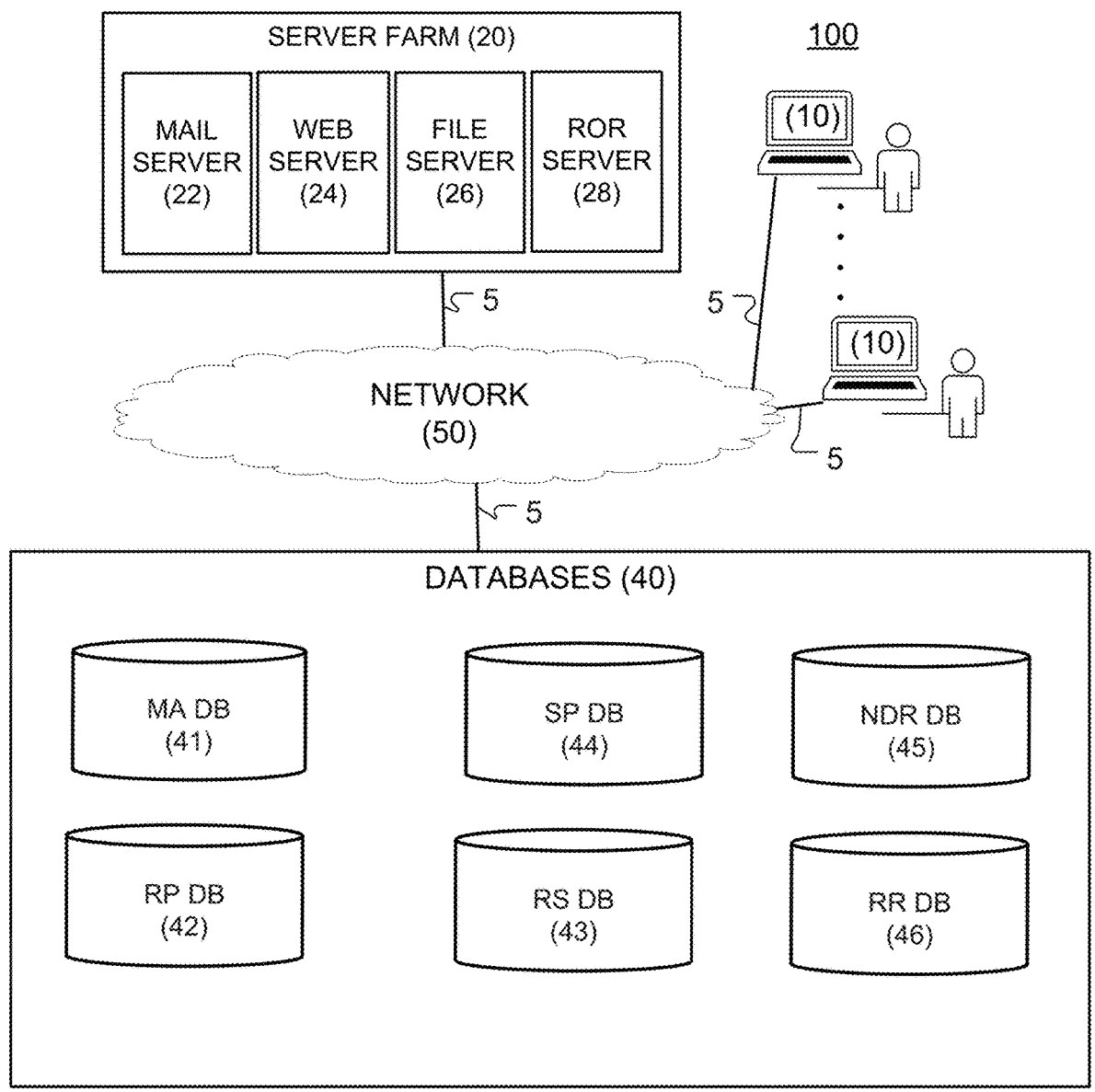
FIG. 1 shows a block diagram of an example of a user environment that is constructed according to the principles of the disclosure.

FIG. 1 shows a non-limiting example of a user environment 100 that is constructed according to the principles of the disclosure. The user environment 100 can include, for example, an enterprise network system, a private network system, a public network system, a hybrid private-public network system, or the like. The user environment 100 includes a plurality of nodes. The user environment includes a backbone network that interconnects various computing and communicating devices. The user environment 100 can include one or more client devices 10, a server (or server farm) 20, a database 40, and a network 50, all of which can be interconnected by communication links 5, and all of which can be located behind a firewall (not shown).

The user environment 100 can include one or more switching and distribution layers (not shown). The switching and distribution layers (not shown) can include one or more layers of switching devices (not shown) or router devices that connect the nodes in the user environment 100, including, for example, the client devices 10, server(s) 20, database(s) 40, or network 50. The router devices (not shown) can be connected to the network 50 by one or more communication links. The router devices (not shown) can include a firewall (not shown). The switching devices (not shown) can be connected to nodes by one or more communication links. The switching devices (not shown) can include ethernet switches.

The server 20 can include a plurality of servers, including a mail server 22, a web server 24, a file server 26, and a request object resolution (ROR) server 28. The server 20 can include large numbers of computing resources that are accessible to the client devices 10 in the user environment 100.

The mail server 22 can send, receive and store electronic mail (e-mail) for one or more members or agents at the client devices 10 in the user environment 100. The mail server 22 can send and receive e-mail using standard email protocols, such as, for example, SMTP, IMAP, POPS, etc.

The web server 24 can be connected to the Internet and can support physical data interchange with other devices connected to the Internet or in the user environment 100. The web server 24 can include a static web server (not shown) or a dynamic web server (not shown).

The file server 26 can be responsible for the central storage and management of data files in the user environment 100, so that client devices 10 in (or external to) the user environment 100 can access files stored in the file server 26 or in the database(s) 40.

The ROR server 28 can comprise a processing unit, such as, for example, the processing unit 200 depicted by the block diagram shown in FIG. 2. The ROR server 28 can include an application program interface (API) unit 260, and a request object resolution (ROR) unit 270. The ROR server 28 can include, or it can be connected to an existing human resources information system (HRIS) or human resources management system (HRMS) (not shown). The ROR unit 260 can create, manage, edit, and provision a request object (RO) workflow during which data, documents, files, records, or other information, data or tasks are passed from one client device 10 to another client device 10 in the user environment 100 for action according to one or more resolution processes.

The database 40 can include a plurality of databases, including a member-agent (MA) database 41, a resolution policies (RP) database 42, a resolution scenarios (RS) database 43, a resolution processes (SP) database 44, a node determination rules (NDR) database 45, and a resolution routes (RR) database 46. Alternatively, the DBs 41-46 can be implemented as regions in a single database 40 or a distributed database (not shown) in the user environment 100. The database 40 can include large numbers of computing resources that are accessible to the computing and communicating devices in the user environment 100. The database 40 can include one or more relational databases.

The MA database 41 can store and manage directory service information, including, for example, information about users, systems, networks, services, and applications throughout the user environment 100. The MA database 41 can store and provide an organized set of records, including records with a hierarchical structure, such as, for example, an enterprise email directory, an enterprise phone directory, an enterprise computer resource directory, an enterprise client device directory, an enterprise computing resource directory, IP addresses, MAC addresses, and the like. The MA database 41 can be implemented with, for example, a lightweight directory access protocol (LDAP) for accessing and maintaining distributed directory information services over, for example, an Internet Protocol (IP) network—in which case, the server 20 can include an LDAP server that includes a directory system agent (DSA), which can operate on, for example, port 389 or 636 (for LDAP over SSL).

The RP database 42 can store and manage one or more resolution policies and associated data. The resolution policies and associated data can be provided and accessed by the ROR server 28, and, more particularly, the ROR unit 270 in the ROR server 28. The resolution policies can be retrieved from the RP database 42 by the ROR unit 270. The resolution policies can include rules for creating, modifying, configuring or implementing an RO workflow, including, for example, settings for each individual step in the RO workflow, settings for steps that can lead to conditional routing in the RO workflow, links with auto-creation of resolution processes for the RO workflow, RO approval policies (e.g., whether delegation of authority is permissible), any policies or configurations that can be implemented to derive resolution scenarios, and the like. The resolution policies can include governance rules, governance business rules, and the like, that can be applied to dynamically evaluate or reevaluate approval steps or to run through one or more node determination rules against a request object (RO) resolution route. The resolution policies and associated data can include, for example, business process policy and configuration rules that can be employed by the ROR unit 270 in creating, configuring, modifying or implementing the RO resolution route. The resolution policies and associated data can be accessed and implemented in, for example, rendering the console 311 (shown in FIG. 5) or console 312 (shown in FIGS. 6A and 6B).

The RS database 43 can store and manage one or more resolution scenarios and associated data that are created, configured, modified, or implemented by the ROR unit 270. The RS database 43 can store and manage workflow schemas associated with each one or more of the resolution scenarios in the database. The RS database 43 can store, for example, resolution scenario data that can be accessed and implemented in rendering the console 313 shown in FIG. 7 on a client device 10.

The SP database 44 can store and manage one or more resolution processes and associated data that are created, configured, modified, or implemented by the ROR unit 270. The resolution processes and associated data can include, for example, one or more resolution schemas and one or more steps for handling request objects in an RO workflow. The resolution schemas can include, for example, business workflow schemas. The handling steps can include, for example, approval steps associated with business objects. The SP database 44 can store and manage one or more resolution processes that are created or configured by a process 400 (shown in FIG. 11). The stored resolution processes can include one or more templates, including one or more associated resolution schemas, that can be applied in rendering a graphic user interface for the initiator cockpit or the agent cockpit.

The NDR database 45 can store and manage one or more node determination rules and associated data that are created, configured, modified, or implemented by the ROR unit 270. The node determination rules can include, for example, rules that can be applied by the ROR unit 270 in evaluating a resolution scenario and/or creating, configuring, modifying, or implementing a RO resolution route. The NDR database 45 can store, for example, node determination rules that can be applied in rendering the consoles 313 or 314, shown in FIGS. 7 and 18, respectively, on a client device 10.

Figures 3A, 3B:
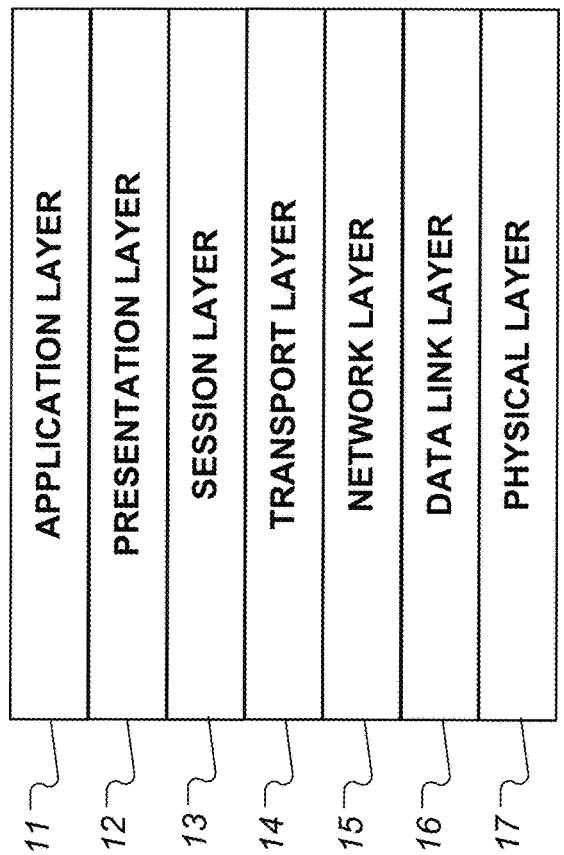
FIG. 3A depicts the Open Systems Interconnection (OSI) model.
FIG. 3B shows an example of a plurality of request object fields, according to the principles of the disclosure.

The RR database 46 can store and manage one or more RO resolution routes and associated data that are created, configured, modified, or implemented by the ROR unit 270. The RR database 46 can include a record associated with each unique resolution route, including, for example, the header portion, data portion, agent portion, attachment portion, and action portion of each RO resolution route. The RR database 46 can store and manage history data for each RO resolution route, from creation of the RO to completion of the RO. The RR database 46 can store and populate, for example, the request object fields shown in FIG. 3B, including a node identification field (e.g., source node "SourceNodeID" and/or destination nodes "DestNode01" to "DestNodeN," where N is a positive integer), a user ID field (e.g., a member identification "MemberID" and/or agent identifications "AgentID01" to "AgentID/V"), a user name field (e.g., a member's name or user name "MemberName" and/or an agent's name or user name "AgentName01" to "AgentNameN"), a date/time stamp field (e.g., date/time RO is created by the source node "RequestDate," or accessed/actioned by a destination node), an RO title field (e.g., title for RO provided by the source node, "SourceTitle"), a note field (e.g., a notation by the source node, "SourceNote" or destination node), an action field (e.g., an action to be carried out with respect to the RO, including for example, review, approve, deny, abandon, etc.), and an attachment field (e.g., a field that indicates whether one or more attachments are associated with the RO, and, if so, a copy of or a link to the attachment).

The RO resolution routes and associated data in the RR database 46 can be updated continuously or periodically, in real-time, thereby ensuring provisioning of a current, complete and optimal resolution route for each RO workflow in the user environment 100, including handling of specific request objects associated with, but not limited to, enterprise systems such as sourcing, engineering, manufacturing, manufacturing definitions, production, control, quality control, product configurations, personnel, accounting, sales, billing, marketing, and the like.

FIG. 2 shows an embodiment of the processing unit 200 that can be included in, for example, the ROR server 28 (shown in FIG. 1) or a server (not shown) in the user environment 100 that includes, for example, a HRIS, HRMS, or similar platform. The processing unit 200 can be configured to interact with, for example, the HRIS, HRMS, or similar platform in the user environment 100 and access and retrieve workflow schemas, business policies, business rules, business scenarios, governance business rules, organizational structures, escalation procedures, delegation procedures, member information, or agent information. The processing unit 200 can be configured to implement the various aspects of the disclosure.

The processing unit 200 can include a processor 210, a storage 220, a hard disk drive (HDD) 230A, an optical disk drive (ODD) 230B, a network interface 240, an input/output (I/O) interface 250, the API unit 260, the ROR unit 270, and a system bus 205 that can be communicatively linked to each of the components in the processing unit 200 by a communication link.

The system bus 205 can be any of several types of bus structures that can further interconnect to a memory bus (with or without a memory controller), a peripheral bus, and a local bus using any of a variety of commercially available bus architectures.

The processor 210 can be any of various commercially available processors. Dual microprocessors and other multi-processor architectures can also be employed as the processor.

The processing unit 200 includes a computer-readable medium that can hold executable or interpretable computer code (or instructions) that, when executed by the processor 210, causes the steps, processes and methods described herein to be carried out. The computer-readable medium can be provided in the storage 220, HDD 230A, or ODD 230B. The computer readable medium can include sections of computer code that, when executed by, for example, the processor 210, the API unit 260, and/or the ROR unit 270, cause the processing unit 200 to carry out a process 400 (shown in FIG. 11), process 500 (shown in FIG. 14), process 600 (shown in FIG. 15), and/or other processes described or contemplated herein, including, but not limited to, processes for generating or rendering the request object fields and associated data (shown in FIG. 3B), the initiator cockpit, the agent cockpit, the consoles 311 to 314 (shown in FIGS. 5-8), the user interfaces 351 (shown in FIG. 9), 352 (shown in FIG. 10), 4021 (shown in FIG. 12), 4041 (shown in FIG. 13), FIGS. 16A-16C, FIGS. 17A-17B, and FIGS. 18A-18C.

The storage 220 includes a read only memory (ROM) 220A and a random-access memory (RAM) 220B. The storage 220 can store data and indexing data that links the stored data to a computing resource. A basic input/output system (BIOS) can be stored in the non-volatile memory 220A, which can include, for example, a ROM, an EPROM, an EEPROM, or the like. The BIOS can contain the basic routines that help to transfer information between components within the processing unit 200, such as during start-up. The RAM 220B can include a high-speed RAM such as static RAM for caching data.

The HDD 230A can include, for example, an enhanced integrated drive electronics (EIDE) drive, a serial advanced technology attachments (SATA) drive, or the like; and, the ODD 230B can read/write from/to a CD-ROM disk (not shown), or, read from or write to other high capacity optical media such as the DVD. The HDD 230A can be configured for external use in a suitable chassis (not shown). The HDD 230A and ODD 230B can be connected to the system bus 205 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The HDD 230A and/or ODD 230B, and their associated computer-readable media, can provide nonvolatile storage of data, data structures, computer-executable instructions, and the like. The HDD 230A and/or ODD 230B can accommodate the storage of any data in a suitable digital format. The storage 220, HDD 230A, and/or ODD 230B can include one or more apps that are used to execute aspects of the architecture described herein.

A number of program modules can be stored in the HDD 230A, ODD 230B, and/or RAM 220B, including an operating system (not shown), one or more application programs (not shown), other program modules (not shown), and program data (not shown). Any (or all) of the operating system, application programs, program modules, and program data can be cached in the RAM 220B as executable sections of computer code.

The network interface 240 can be connected to the network 50 (shown in FIG. 1). The network interface 240 can include a wired or a wireless communication network interface (not shown) and/or a modem (not shown). The network interface 240 can receive and transmit data and instruction signals between the processing unit 200 and one or more nodes (e.g., client device 10, server 20, or database 40). When used in a local area network (LAN), the processing unit 200 can be connected to the LAN network (e.g., network 50, shown in FIG. 1) through the wired and/or wireless communication network interface; and, when used in a wide area network (WAN), the processing unit 200 can be connected to the WAN network through the modem. The modem (not shown) can be internal or external and wired or wireless. The modem can be connected to the system bus 205 via, for example, a serial port interface (not shown).

The (I/O) interface 250 can receive commands and data from an operator via the I/O interface, which can be communicatively coupled to one or more input/output devices, including, for example, a keyboard (not shown), a mouse (not shown), a pointer (not shown), a microphone (not shown), a speaker (not shown), a display (not shown), and/or the like. The received commands and data can be forward to the processor 210 from the I/O interface 250 as instruction and data signals via the bus 205.

The API unit 260 can include one or more application program interfaces (APIs). The APIs can include, for example, web APIs, simple object access protocol (SOAP) APIs, remote procedure call (RPC) APIs, representation state transfer (REST) APIs, or other utilities and services APIs.

The ROR unit 270 can be one or more devices or one or more modules that are separate from the processor 210, as seen in FIG. 2, or integrated with the processor 210. The ROR unit 270 can include one or more computing devices (not shown) or communicating devices (not shown). The ROR unit 270 can be connected to the system bus 205 and configured to receive at one or more inputs (not shown) and transmit at one or more outputs data and instruction signals. The ROR unit 270 can include one or more modules that can be configured to handle process configurations, resolution rules, hook solutions, and application exits. The ROR unit 270 can carry out the processes 400, 500, 600, shown in FIGS. 11, 14, 15, respectively.

The user environment 100 (shown in FIG. 1), including nodes such as the client devices 10, server 20, and database 40, can be configured to operate according to the Open Systems Interconnection (OSI) model when communicating internally or over network systems. The user environment 100, including the client devices 10, server 20 (including the processing unit 200, shown in FIG. 2), and databases 40, can operate at any one or more of the seven layers in the OSI model (shown in FIG. 3) at any instant in time. That is, referring to FIG. 3, which shows the seven-layer OSI model, the various devices in the user environment 100 can operate at the application layer 1, presentation layer 2, session layer 3, transport layer 4, network layer 5, link layer 6, or physical layer 7.

Referring to FIG. 3, the application layer 1 is the OSI layer in a computing device (such as, for example, the client devices 10) that is closest to the end user (e.g., member or agent). The application layer 1 interacts with software applications in the computing device that implement a communicating component. The application layer 1 can include, for example, a search engine or any other software application which the end user can interact with to carry out a functionality.

The presentation layer 2 establishes context between software applications, which might use different syntax and semantics. The presentation layer 2 transforms data into a form that each software application can accept. An operating system is an example of the presentation layer 2.

The session layer 3 controls the connections between computing devices in the user environment 100, including, for example, the client devices 10, server 20, and database(s) 40. This layer is responsible for establishing, managing and terminating connections between local and remote applications. The layer can provide for full-duplex, half-duplex, or simplex operations, and is responsible for establishing checkpointing, adjournment, termination, and restart procedures.

The transport layer 4 provides the functional and procedural mechanisms for transferring variable-length data sequences from a source computing device to a destination computing device, while maintaining quality-of-service (QoS). The transport layer 4 controls the reliability of a given link through flow control, segmentation and desegmentation, and error control. The transport layer 4 can include, for example, tunneling protocols, the Transmission Control Protocol (TCP) and the User Datagram Protocol (UDP).

The network layer 5 provides the functional and procedural mechanisms for transferring data packets from a node on a network to another node on a different network. If the data to be transmitted is too large, the network layer 5 can facilitate splitting the data into a plurality of segments at the node and sending the fragments independently to the other node, where the segments can be reassembled to recreate the transmitted data. The network layer 5 can include one or more layer-management protocols such as, for example, routing protocols, multicast group management, network layer information and error, and network layer address assignment.

The link layer 6 is responsible for node-to-node transfer between computing devices in a communication system. In IEEE 802 implementations, the link layer 6 is divided into two sublayers, consisting of a medium access control (MAC) layer and a logical link control (LLC) layer. The MAC layer is responsible for controlling how devices in a network gain access to a medium and permission to transmit data. The LLC layer is responsible for identifying and encapsulating network layer protocols, and for controlling error checking and frame synchronization.

The physical layer 7 includes the hardware that connects the computing systems in the user environment 100, including, for example, the client devices 10, the server 20, and the database(s) 40. The hardware can include for example connectors, cables, switches, and the like, that provide for transmission and reception of instruction and data streams between the computing devices.

When communicating in the user environment 100 or across one or more networks (for example, the Internet), each node can be identified by a unique identifier such as, for example, an Internet Protocol (IP) address, a MAC address, a network address, a geolocation, and the like. The IP address can include a 32-bit number (e.g., IPv4) or a 128-bit number (IPv6). The IP address can serve two primary functions. First, the IP address can identify the node (e.g., client device 10 or network interface). Second, the IP address can identify the location of the node (e.g., client device 10 in the user environment 100).

Figure 4:
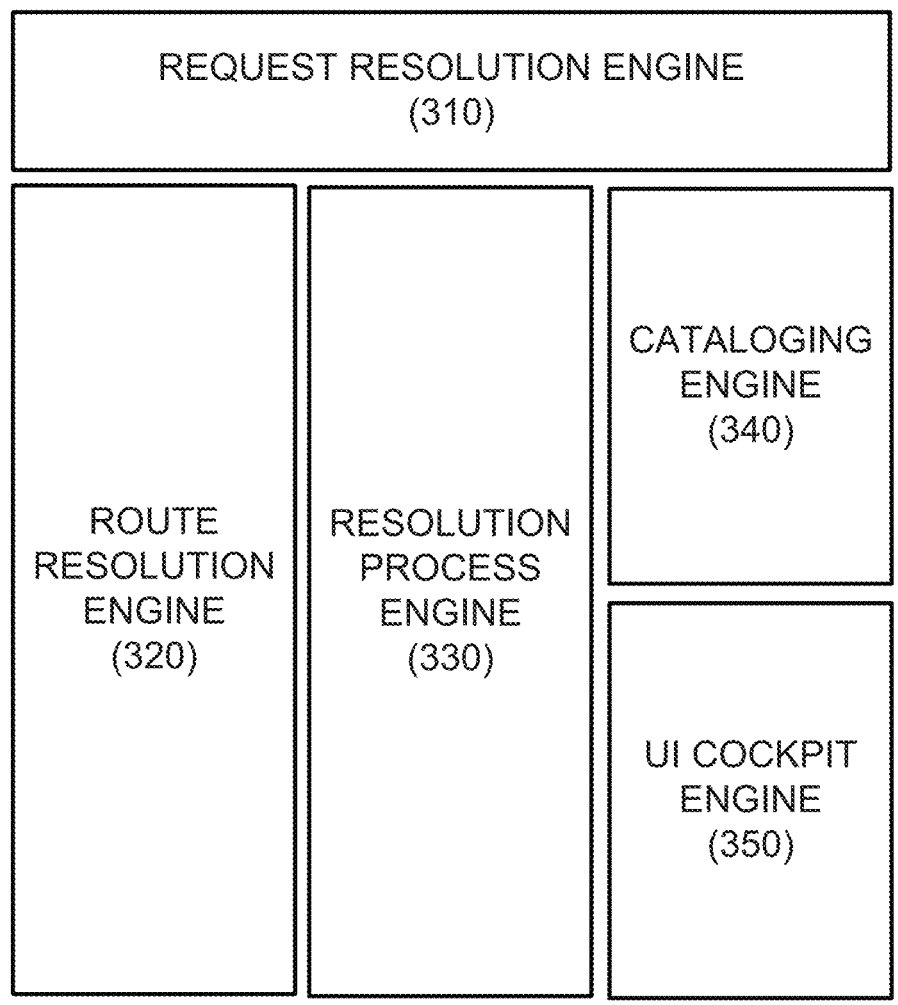
FIG. 4 shows an example of a request resolution (RR) platform that can be implemented in the processing unit in FIG. 2.

FIG. 4 shows a block diagram of a request resolution (RR) platform 300 that can be implemented in the ROR unit 270 (shown in FIG. 2) according to the principles of the disclosure. The RR platform 300 can include a request resolution engine (or "AAE") 310, a route resolution engine 320, a resolution process engine 330, a cataloging engine 340, and a user interface (UI) cockpit engine 350. The RR platform 300 can be implemented as one or more computing devices or modules. The UI cockpit 350 can include a video driver (not shown) or an audio driver (not shown) to reproduce a graphic user interface (GUI) or sound, or to cause a GUI or sound to be reproduced on a client device 10. The RR platform 300 can be connected to, integrated with, or built on top of an existing enterprise network system, including, for example, a portion of the enterprise network system that handles human resource applications or organizational structures.

The request resolution engine 310 can, alone or in communication with the resolution process engine 330, create, configure, define, modify or implement resolution processes, resolution scenarios and resolution schemas according the principles of the disclosure. The AAE 310 can set up or facilitate the setting up of controls such as, for example, escalation procedures, whether a resolution process permits delegation of authority and other controls. The AAE 310 can generate or can communicate with, for example the UI cockpit engine 350 to generate graphic user interfaces (GUIs) such as, for example, console 311 shown in FIG. 5, which can be rendered at a destination node such as a client device 10 at an agent location. The console 311 can allow for modification or configuration of various controls.

As seen in FIG. 5, the GUI can include modifiable controls such as, but not limited to "enable delegation," "enable delegation to non-CPH," "hide from ITHD support list," "send to initiator upon trigger," "enable change by route list agent," "disable change by inserted agents," among others.

The AAE 310 can generate or can communicate with, for example, the UI cockpit engine 350 to generate a further GUI such as, for example, the console 312 (shown in FIGS. 6A and 6B) that can link to a plurality of predetermined resolution (or business) processes and resolution (or business) applications, which can be stored locally in the server 20 (shown in FIG. 1) or in the SP database 44 (shown in FIG. 1). The GUI can include expandable folders that allow for easy identification and selection of resolution processes and/or resolution applications.

The AAE 310 can generate or can communicate with the UI cockpit engine 350 to generate a further GUI such as, for example, the console 313 (shown in FIG. 7) that includes an example of a resolution scenario defined by or defined in cooperation with the resolution process engine 330. As seen in FIG. 7, the console 313 can include a plurality of resolution scenarios which can be selected and implemented by a client device 10 at the control of, for example, an agent via the agent cockpit.

The AAE 310 can create, configure, define, modify, or implement, or can work in cooperation with the resolution process engine 330 to create, configure, define, modify, or implement a resolution scenario, such as, for example, the scenario route list 314 shown in FIG. 8. The resolution scenario can be referenced by, for example, the route resolution engine 320 when generating an RO resolution route. The resolution scenario can be stored locally at the server 28 or RS database 43 (shown in FIG. 1).

The route resolution engine 320 can generate a resolution route for each request object (RO) that is received from a source node, such as, for example, a client device 10. The generated RO resolution route can include a complete list of nodes and routes through which the RO is to travel in the user environment 100. The resolution route can include a routing table (e.g., a look-up-table) that defines a pathway for the request object in the user environment 100, including all the nodes in the pathway, as well as the approval steps and/or the sequencing through which the RO is to be transmitted along the identified routes in the user environment 100, and the tasks to be performed by each node along the pathway.

The resolution route for each RO can be stored locally in the server 28 or in the RR database 46 (shown in FIG. 1). The RO resolution route can be generated by the route resolution engine 320 by accessing a resolution policy in the RP database 42 and a resolution scenario in the RS database 43 and evaluating the resolution scenario based on the resolution policy. The route resolution engine 320 can reference one or more node determination rules in the NDR database 45 and generate, configure, define, or modify the RO resolution route to dynamically reevaluate and edit the resolution route in accordance with an associated resolution scenario, thereby providing a real-time resolution route the can include a complete and up-to-date or current list of all nodes, the routes to be travelled, the sequence of travel between each identified node. FIG. 14 shows an example of a resolution route generation process 500 that can be implemented by the route resolution engine 320 to generate the resolution route for a given request object that is initiated at and received form a source node (e.g., a client device 10). The process 500 can be triggered upon receiving the RO from the source node, or in response to a function call signal from the AAE engine 310, or in response to a functional call signal from the resolution process engine 330 (e.g., during execution of the process 400, shown in FIG. 11).

The AAE 310 can include a runtime environment (or RTE) that can iterate through the RO resolution route until, for example, the final step in the RO workflow is completed. The AAE 310 can include, for example, a finite state machine that can iterate through each state in the RO resolution route, including evaluating each state in the resolution route and determining how to transition from one state (or node) to another, and the action necessary to effectuate each transition. The AAE 310 can create, configure, modify or implement an activity that can be carried out a given state.

Each state can represent a node in the RO resolution route. Each state can be a position in the resolution route that a given request object can be in at any given moment. The transition can be a pathway between two or more states that shows how a request object can travel between the states (or nodes). The transition can include a current state and a next state, or a current state and a previous state. The action can include, for example, a request object resolution signal (or action signal) received from a destination node (e.g., from an agent cockpit being rendered at a client device 10) that represents an approval of an action request (e.g., where the received action signal indicates that the RO should move to the next state), a denial (e.g., where the received action signal indicates the request object should move to the previous state or be sent back to the source node), abandonment (e.g., where the received action signal indicates the RO should move to an abandoned or canceled state), reinitiation (e.g., where the received action signal indicates that the request object should be sent back to the start state), resolution (e.g., where the received action signal indicates that the request object should be forwarded to the completed state). The activity can include one or more actions that are to be carried out at a given state after a request object enters that state. The activity can include, for example, a note action (e.g., a notation that is to be added to a note field, shown in FIG. 3B), a notification action (e.g., an email is to be sent to the source node or a destination node), an destination node edit action (e.g., one or more destination nodes in the resolution route that are to be added, deleted, or modified). Once a request object has been resolved (e.g., an RO workflow request completed), the AAE 310 can send, or it cause a notification to be sent with the final result to the source node or one or more destination nodes.

The cataloging engine 340 can access member-agent data in the MA database 41, request policy data in the RP database 42, resolution scenario data in the RS database 43, resolution process data in the SP database 44, node determination rules data in the NDR database 45 or resolution route data in the RR database 46 (shown in FIG. 1), which can include direct assignment data, resolution rule data, and delegation data related to the request object. The resolution rule data can include one or more rules related to a particular function, position, role, job, task, or the like, in an enterprise (such as, for example, a corporation). Based on the accessed data and rules, the cataloging engine 340 can define enterprise financial authorities with corresponding thresholds. Since the user environment 100 can change frequently due to such factors as, for example, changes in the user environment 100, corporate restructuring, changing business environment, or the like, the information generated by the cataloging engine 340 can be checked periodically to review the current level of authority for each destination node to determine if the destination node's level of authority is still appropriate given the current structure or state of operations in the user environment 100, and whether the authority assignment is in line with any enterprise limitations (e.g., not exceeded), and whether proper controls are in place. Additionally, personal delegations for each destination node can be reviewed periodically (or continuously) and modified (e.g., extended, voided, etc.) as appropriate to ensure that the appropriate destination node is tasked with the approval limit based on the relevant financial threshold as described in the resolution policies.

The user interface (UI) cockpit 350 can generate the initiator cockpit or the agent cockpit depending on whether the processing unit 200 is accessed by the source node (e.g., a client device 10 that is used by an initiator) or a destination node (e.g., a client device 10 used by an agent). For instance, the UI cockpit 350 can generate and transmit data and instruction signals to the source node comprising a client device 10 at a member location to produce the initiator cockpit, which can include the display screen 351 shown in FIG. 9. As seen in FIG. 9, the initiator cockpit can include a GUI 351 that displays a plurality of fields (e.g., request number, requested name, organization, requested by, and request details). Each field in the GUI 351 can receive data or instructions (e.g., from the initiator) and send the captured data and instructions in a request object to the server 28 (shown in FIG. 1).

Figure 10:
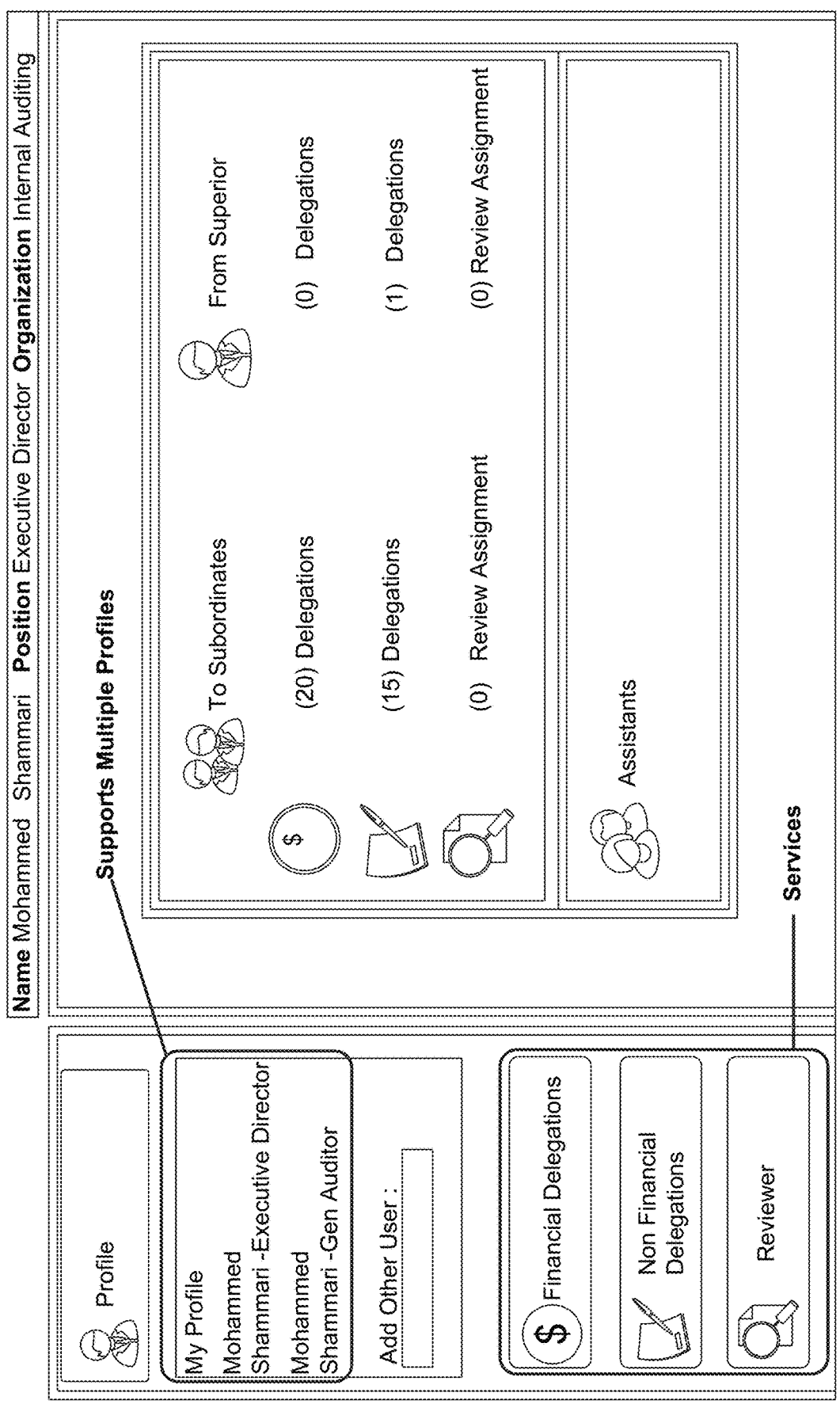

The UI cockpit 350 can generate and transmit data and instructions signals to a destination node comprising a client device 10 at an agent location to produce the agent cockpit, which can include the display screen 352 shown in FIG. 10. The agent cockpit can be configured to render a GUI that allow for creation, definition, or modification of delegation or reviewer assignments, checking of authorization level, and the like. The agent cockpit can include an inbox or a portal that links to an inbox for the particular destination node, one or more dynamic filters, a global search engine, intelligence analytics, and other computing resources to aid the destination node in the process of decision making and implementation with respect to a given request object.

FIG. 11 shows an example of a configuration process 400 that can be carried out by the processing unit 200 (shown in FIG. 2) to define and configure a resolution schema, a resolution scenario, a resolution process scenario and a resolution process. For instance, the configuration process 400 can be carried out by the AAE 310 or the AAE 310 in cooperation with the resolution process engine 330 (shown in FIG. 4). The process 400 can be initiated upon detection of an RO workflow trigger.

Referring to FIG. 11, an instruction can be received by the ROR unit 270 (shown in FIG. 2) to create or configure a new resolution process (Step 405). The instruction can include a functional call signal from the ROR unit 270. The resolution process can include, for example, a new business process to manage and implement installation of new equipment (not shown) in the user environment 100. The new business process can be titled as "New Network Equipment Request" resolution process and associated with handling of RO workflow approval requests for installation of new equipment in the user environment 100, such as, for example, a request object from a source node (e.g., client device 10) for installation of a new network interface at the source node location. FIG. 12 shows an example of a GUI 4021 that can be generated by the ROR unit 270 and rendered at a destination node (e.g., a client device at an agent location) or a source node (e.g., a client device 10 at a member location). As seen in the GUI 4021, a "Create" field can be generated, which can be rendered to receive a selection to cause generation and display of the GUI 4021 in FIG. 12, which can facilitate creation and configuration of the new resolution process—e.g., the "New Network Equipment Request" resolution process for handling and implementing request objects for installation of new equipment in the user environment 100.

As seen in FIG. 12, the GUI 4021 can be rendered to include: a resolution process name field for entry of a resolution process name (e.g., "New Network Equipment Request"); a financial selector (e.g., a radio-button labeled "Financial") for identifying the resolution process as related to a financial process; a delegation selector (e.g., a radio-button labeled "Delegation") for control of whether delegation is allowed for this resolution process; a "Maximum Agent Level" field for entry and control of the maximum approval level this resolution process is allowed to go to; an "Application Area" field for entry of the associated application area (e.g., "Administration"); a resolution category field (e.g., "Assets") for entry of the particular category of the resolution process; etc. In this example, the resolution controls allow delegation for this particular resolution process and the maximum approval level is set to "department head."

The ROR unit 270 can create one or more master-detail configurations (Step 410) and resolution scenarios (Step 415). The master-detail configurations and resolution scenarios can be populated with the data and instructions entered into the GUI 4021. In this regard, a GUI 4041 (shown in FIG. 13) can be generated and rendered at a destination node (e.g., a client device 10). The GUI 4041 can be rendered on a source node. The master-detail configuration can include a detail object such as, for example, an approval object like a new network interface to be installed at a particular location in the user environment 100 (shown in FIG. 1). The resolution scenarios can include one or more criteria or conditions for handling of a resolution object in this resolution process. For instance, the resolution scenario can include a business scenario and the criteria or conditions can include business criteria or conditions for rendering a decision (action) related to the request object.

The GUI 4041 can be rendered to include one or more domains (e.g., "Process Policy," "Reminders & Escalation," "Process Controls"), and each domain can include one or more fields (e.g., "category," "enable delegation," "enable delegation to non-CPH," "keep duplicates w/different category," "financial process," "first WF reminder," "repeat every," "days," "hours," "minutes", "escalate WF after," "cancel WF after," "disable rejection messages," "max approval hierarchy," "send to initiator upon trigger," "enable change by route list agent," "disable change by inserted agent," "hide from ITHD support list," "disable SoD checks," "proponent organization," "technical organization"). In the Process Policy domain, whether delegation is allowed can be set for this resolution process (which can be copied from the previous step) and if yes, the resolution policy can be checked to determine the permitted delegation level, which in this example can be delegation to non-chief position holders. The resolution process can be identified as a financial process by selecting the "financial process" field and a base currency can be entered for the resolution process' transactions. In the "Process Controls" domain, an instruction can be entered to send the request object back to the source node upon triggering the workflow, or whether any destination nodes (or source node) can edit the resolution route, including, for example, adding, deleting or editing one or more destination nodes (including, e.g., one or more destination nodes for a non-required member or agent).

After creation of the master-detail configuration (Step 410) and resolution scenarios (Step 415), the ROR unit 270 can configure resolution criteria for the resolution process (Step 420). The resolution criteria can include, for example, approval criteria, reminders, escalation procedures, etc. Afterwards, resolution criteria can be configured with criteria values (Step 425), such as, for example, number of days/hours/minutes when reminders should be sent, the maximum approval level, etc. For instance, the first reminder can be configured to be sent after five days and repeatedly sent every two days thereafter; and, regarding escalation, this criteria can be configured to escalate after 12 business days, and the request object to expire in 90 days.

The approval level can be configured, for example, based on a selection of the associated data filed in the "Process Controls" domain rendered by the GUI, or by referencing an organization hierarchy record in the MA database 41 (shown in FIG. 1), or by referring to a look-up-table stored locally or in the MA database 41, or the like (Step 430). In the above non-limiting example, the maximum approval level can be set to department head, and, in the "Process Controls" domain, a selection can be made to send the request object to the source node upon triggering the workflow and other nodes (e.g., destination nodes) can be permitted to edit the resolution route. However, a default rule can be set that defines the default level to, e.g., the department head associated with the source node (or the member at the source node). Each resolution scenario can have an approval route list configuration with an agent determination rule for every approval level.

A determination can be made whether a resolution rule is provided (Step 435). The resolution rule can include a business rule. The resolution rule can include a rule such as, for example, whether the source node or a destination node may be permitted to edit the resolution route (e.g., insert or delete other non-required nodes). If it is determined that a resolution rule is not provided (NO at Step 435), then a destination node determination rule (including an agent determination rule) can be created (Step 440) for identifying a destination node that is to be added to, deleted from, or modified in the resolution route generated by the resultant resolution process, otherwise (NO at Step 435) a determination rule can be determined, which can be based on the resolution rule (Step 445).

A determination can be made whether additional destination nodes are permissible for addition to the resolution route (Step 450). If it is determined that more destination nodes can be defined and added to the resolution route (YES at Step 450), then a destination node determination rule (including an agent determination rule) can be created (Step 440), otherwise (NO at Step 450) a resolution rule process can be assigned (Step 452). Next, a determination can be made whether a new approval level should be configured for the additional destination nodes (Step 455), and whether other resolution scenarios should be configured (Step 460).

If it is determined that a new approval level should be configured (YES at Step 455), then the new approval level can be approved for the additional node(s) (Step 430), otherwise (NO at Step 455) the determination regarding additional resolution scenarios (Step 460) can be carried out.

According to a simple, non-limiting example, a route list can have approval levels associated with the source node or each destination node, such as, for example, direct supervisor of the member or agent at the node (using a hierarchy business rule: Supervisor), department head (using a hierarchy business rule: Department Head), management group (MG) as a position group, and the like. The position group can be modified, or additional position groups can be added (Steps 450, 452, 455). The position group(s) can be added or injected as an additional approval level (e.g., final approval level) and a destination node category (e.g., approver, reviewer, special approver) can be assigned to the newly added approval level (Steps 455, 430).

In certain resolution scenarios (such as, e.g., certain business scenarios), it may be desirable to create a RO workflow that has as part of its resolution route a level that includes more than one destination node—or a group of destination nodes (a "position group"). A position group can include a static position group or a dynamic position group. A static position group is a position group having destination nodes that are defined and maintained by the platform 300 (shown in FIG. 3). At runtime, the nodes in the static position group can be resolved using position group configuration tables.

On the other hand, there are situations where the nodes in a position group can be different for each workflow instance (e.g., destination nodes that vary depending on the business case). In that case platform 300 (shown in FIG. 3) can allow an application to identify nodes and modify the position group (i.e., a dynamic position group) via an application exit.

There are many ways that an application could choose (e.g., depending on the business case), store or identify nodes in a position group, including, for example: storing the nodes of a position group in an application-specific database table (e.g., in the MA database 41, shown in FIG. 1) with a unique key that can be used at runtime to resolve the group nodes; resolving the group nodes based on a specific job, a role, an organizational unit, etc.; using an enterprise (e.g., corporate) LDAP to resolve group nodes based on, for example, Outlook e-mail accounts. The foregoing are some examples of ways to resolve dynamic position group nodes. An API can be called to access and retrieve UserID information from, for example, the MA database 41 (shown in FIG. 10) and provide information to AAE platform 300 (shown in FIG. 3) to insert information, such as, for example, node, user ID, user name, information about the associated user (e.g., position, role, job description, etc.), into the resolution route for the RO.

If it is determined that other resolution scenarios should be configured (YES at Step 460), then additional resolution scenarios can be configured (Step 415), otherwise an approval status (or action) can be configured (NO at Step 460, then Step 465). The approval status (or action) can be configured as a resolution rule. In the foregoing example, after creation of the additional approval level, controls can be configured for the behavior of this newly added approval level (Step 465). For instance, if a rule "Use this level for Mass Approval" is assigned to the additional level, then the AAE 319 (shown in FIG. 4) can elect not to send a destination device each instance of a resolution object with this level. Instead, a grouping of resolution objects (a "basket") can be collected for the different instances and sent to the particular destination node as one single work item. So, for example, if ten (10) request objects are directed to a single destination node, the AAE 310 can group them in a single grouping and dynamically build and render a GUI listing these individual request objects at the destination node. The destination node can the then process the request objects in the grouping all at once or separately. The resolution objects can be grouped as work items in an inbox rendered at the destination node. In addition to grouping, the resolution process engine 330 can dynamically build the list and all possible actions at runtime, basing everything on the process configuration with the ability for any application to embed its own specific logic.

The AAE 310 (shown in FIG. 4) can configure processing of the request objects to switch between "sequential" and "parallel" processing by, for example, including a configurable flag in the approval level configuration to meet the RO workflow requirements.

After configuration of the approval status (action) (Step 465), a determination can be made whether an approval status should be extended (Step 470). If it is determined that an approval status (or action) should be extended (YES at Step 470), then a status extension can be created (Step 475) and the process 400 ended, otherwise a determination can be made whether any additional approval statuses (actions) should be configured (NO at Step 470, then Step 480).

If it is determined that other approval statuses should be configured (YES at Step 480), then the approval statuses can be configured (Step 465), otherwise a resolution authority can be created (NO at Step 480, then Step 485). A process scenario can then be assigned (Step 490) and a determination made for any new authorities (Step 495). If no new authorities are to be configured (NO at Step 495), then the process 400 ends, otherwise a resolution authority can be created (Step 485) and Steps 490 and 495 repeated.

FIG. 14 shows an example of a resolution route generation process 500, constructed according to the principles of the disclosure. Upon detection of a workflow trigger, an appropriate resolution process can be identified and retrieved (Step 510). The resolution process can be identified by a unique Process ID that can be stored in the SP database 44 (shown in FIG. 1), which can then be referenced to locate and retrieve the associated resolution process. Alternatively, the process 400 (shown in FIG. 11) can be carried out at Step 510. The retrieved resolution process can be resolved with respect to a resolution (or business) scenario (Step 520) and approval steps determined (Step 530). The determined approval steps can be executed together with node determination rules (Step 540) and a determination made whether any additional approval steps should be determined (Step 550). If it is determined that additional approval steps should be determined (YES at Step 550), then Steps 530 to 550 can be repeated, otherwise a resolution route can be generated (NO at Step 550, then Step 560).

FIG. 15 shows an example of a notification process 600 in an application callback exist platform. Initially, a resolution transaction can be executed (Step 610). The resolution transaction can include, for example, a business transaction. Based on the resolution transaction, a determination can be made whether approval is required (Step 620). If it is determined that approval is not required (NO at Step 620), then the resolution transaction can be carried out (Step 610) and the process 600 end for that particular transaction.

If it is determined that approval is required (YES at Step 620), an RO workflow trigger can occur and the AAE 310 (shown in FIG. 4) can be run (Step 630). The AAE 310 can iteratively work through the entire RO workflow resolution route. A determination can be made at various steps in the resolution route to determine whether an activity is done (Step 640). For instance, a determination can be made whether the request object has been approved, denied, canceled, abandoned, or requires additional information. If it is determined that the resolution workflow is not done (NO at Step 640), then the resolution process engine 330 can continue to work through the resolution route for the request object (Step 630), otherwise a notification can be generated and sent to the source node (Step 650).

According to a further aspect of the disclosure, an application exit framework ("AEF") is provided that can dynamically embed unique resolution logic into the resolution process and apply specific technical rules to the runtime workflow. The AEF can include a plurality of APIs, each of which can have its own defined purpose. The AEF can be located in the API unit 260 (shown in FIG. 2).

The AEF can include, for example a GenAppForm that allows an application in the user environment 100 (shown in FIG. 1) to transmit content of a request object to the AAE 310 (shown in FIG. 4). The content can include displayable information that can be rendered on a display of destination node (e.g., a client device 10) to allow the appropriate action to be selected and executed with respect to the associated request object.

According to a non-limiting aspect of the disclosure, a smartform can be designed and created on a node using, for example, SAP, that can be called by the AAE 310 when the GenApp Form is executed. FIGS. 16A and 16B show an example of a PDF that can be generated and rendered on a display device at a node (e.g., the display device of a client device 10, shown in FIG. 1).

An application can choose to send PDF data directly to the AAE 310 via the AAE trigger function module (not shown), without any need to implement a GenApp Form Exit. FIG. 16C shows an example where PDF data is sent directly to the AAE 310 via the AAE trigger function module.

Another option that an application can use is to send a URL to render a page (static or interactive) on a display device at the node. In that case, the application should send the URL string to the URL parameter and use a form code, such as, for example, "04." The application can send the URL via the AAE 310 without the need to implement the GenApp Form Exit by sending the URL to the URL parameter in AAE trigger function and making sure the form code is correct.

While most applications may use PDF format as their default request object approval form in the AAE platform 300, other scenarios can build their approval forms using, for example, a web technology, a hyperlink to an external website or application, or the like. Some scenarios can require dynamically changing the content of their forms, including hiding or unhiding certain information on the form based on who is looking at the rendered form at the node. All of these options and more can be done using the GenApp Form Exit, where each application can choose what to display inside the GUI rendered on the node. FIGS. 17A and 17B show two examples, including an example using a standard PDF (FIG. 17A), and the other using a web technology (FIG. 17B) to build its form. Actions made by a user inside the latter form can be captured directly by the application. The AAE approval screen in this case can be provided as a shell with an application toolbar.

Alternatively, an application can send static HTML code to the AAE trigger function module (e.g., as a string passed to the URL parameter) to be displayed as the request object content making sure the form code is set to the appropriate code (e.g., "01").

The AEF can include a plurality of exits that an application can use to embed its own logic. FIG. 18A shows an example of one type of exit. With this type of exit, an application can intercept a user's workflow action, by, for example, generating and rendering a popup message, a display screen, or simply by updating the records associated with the request object or user. The exit can include a call for confirming a user decision.

In the example shown in FIG. 18A, the user's workflow action is intercepted with a confirmation popup message that is rendered at the node associated with the user. FIG. 18B shows an example of a confirmation popup message that can be rendered on the node.

A second type of exit can allow an application to add its own application buttons, for example, as shown in FIG. 18C. In this instance, an application can add a button to take the user to an application-specific transaction, or a popup message within an approval screen to perform a specific action, after which the display can be reverted to the approval screen to resume processing the request object. Also, within this exit, the application can choose to hide some or all the standard buttons (e.g., Route List, Remarks, Attachments, etc.).

A third type of exit can allow an application to add short details about the request object. The description can be shown, for example, in a standard SAP workflow inbox after the request object is selected (e.g., clicking the work item).

A fourth type of exit can include a set attachment and remarks for notification and review cycles. This exit can be applicable for processes where a private review/notification cycle flag is enabled. When this exit is enabled, the application can read the workflow attachments and remarks of the sub workflows created at the node.

A fifth type of exit can include a call for logic to be run at initiation. This exit can be called before generating the resolution route (or approval route list) and starting the workflow. Some application may need to perform certain checks or run a specific logic that requires full access that can only be executed by a system.

A sixth type of exit is an approval route list sorting exit. This exit can be called from the route resolution engine 320 (shown in FIG. 4), such as, for example, after resolving an approval route list. This exit can allow an application to modify the resolution route (including an approval route list) and sort it in the order determined by the application for any given business case.

A seventh type of exit is a forward item exit. This exit can allow a destination node to forward the request object to another destination node. With this exit, an application can intercept actions at the destination node and check selections made by the user to determine whether the selections are permitted.

An eight type of exit is a pre-trigger application exit. This exit can allow an application to execute special logic to perform specific tasks or mainly create or process data before committing to trigger the workflow from the AAE side. This exit can be used to execute a business logic that can later be used by the triggered request object. This exit can be used by non-SAP applications that may need to create data or records for SAP applications and use the data throughout the execution of the workflow.

A ninth type of exist is a request object exit. This exit can render an informational popup message at the node, such as, for example, within an approval screen of an agent cockpit on the client device 10 (shown in FIG. 1). This exit can be used where it is desirable to popup a message to a user upon selecting the request object, and in other cases where it is desirable to generate a message after executing the request object. Therefore, logic can be implemented in a way to be executed before or after the user takes an action.

A tenth type of exit is a mail exit. With this exit different kinds of notifications can be sent to the nodes (e.g., via mail server 22, shown in FIG. 1) associated with a particular request object. The notifications can include an arrival notification, a reminder notification, an escalation notification, a rejection notification, etc. The AAE 310 (shown in FIG. 4) can pass the notification type to the mail exit along with other useful information to help the application to design the right message for the right workflow node.

An eleventh type of exit is a resolution route exit. The resolution route exit allows an application to intercept an action to modify the resolution route. An action in a resolution route can include, for example, an instruction to insert a new destination node or delete an existing destination node. As a default, insert and delete instructions can be enabled for a particular resolution process and made open to whatever node has access to modify the resolution route, such as, for example, a destination node at an agent location or at the agent's staff's location. Using the resolution route exit, an application can choose to embed its own controls, such as preventing inserting a specific node category after a certain approval level or to prevent deleting a level after a defined period of time (e.g., a predetermined number of days) or any other logic that may be applicable.

For this exit, the AAE 310 can pass the action (I/D) to indicate whether this is an "Insert" or "Delete" action along with several other details about the approval level. The application logic can vary from one application to another. Some applications may choose to prevent the action in certain situations by generating an error message and some may choose only to update their records seamlessly.

A twelfth type of exit is a workflow mass exit that allows, for example, resolution processes that are designed and configured to use mass workflows to be implemented. For any level that is configured by the AAE 310 to receive groupings of request objects (e.g., mass workflows of a specific process), the AAE 310 can generate a request object group and instead of sending the request objects individually to a destination node, the AAE 310 can send (or cause to be sent) one generic group work item that can be transmitted to the destination node and rendered such that when the group work item is selected (e.g., double clicked) the group work item is executed and the mass exit can be called. The title and content of a request object and the content of the workflow can be controlled entirely by the workflow mass exit, which can be implemented and maintained from the application side.

The content of a mass workflow exit can be included in a table that can be rendered on a display device, for example, using an ALV grid, at a destination node. The structure and columns of the table as well as workflow action buttons and other behaviors can be controlled from the mass exit. Each action within the mass approval screen can be controlled by an exit type, which can include a value that is passed from the AAE 310 to the mass exit. For instance, the construction of the content screen can be done through the first type of exit (discussed above). The table structure can be used to define the field catalog that represents the columns of the table.

A thirteenth type of exit is a postlevel exit. This exit allows an application to execute its business logic in the background after each action without disrupting the workflow cycle. An application can choose this exit to run batch programs that require full authorization access.

A fourteenth type of exit is a callback exit. This exit allows an application to receive the final status of resolution process from the platform 300 (shown in FIG. 4) once the workflow cycle ends.

The terms "a," "an," and "the," as used in this disclosure, means "one or more," unless expressly specified otherwise.

The term "client device," as used in this disclosure, means a computer or a communicating device that is configured to operate in the user environment 100, including sending and receiving data and instructions signals over one or more communication links.

The term "communicating device," as used in this disclosure, means any hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation. The communicating device can be portable or stationary. A communicating device can include a computing device.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, WiFi, WiMAX, IEEE 802.11, DECT, 0G, 1G, 2G, 3G or 4G cellular standards, Bluetooth, or the like, without limitation.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computing resource," as used in this disclosure, means software, a software application, a web application, a web page, a computer application, a computer program, computer code, machine executable instructions, firmware, or the like. A computing resource can include an email account, a user account, a network account, or the like.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, Bluetooth, or the like.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, a network model or the like. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP, etc.

The term "node," as used in this disclosure, means a computing device, a communicating device, a computing resource, an email address, a uniform resource locator (URL), or the like. Each node can be associated with a unique member or agent. A node can include a client device 10, the server 20, or the database 40.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A method for generating a dynamically configurable resolution route for transmitting a request object to one or more nodes in a network, the method comprising:
   receiving a trigger signal from a first node in the network, the trigger signal being indicative of a request object being generated at the first node;
   querying a database in response to the trigger signal, and based on the request object, to access a resolution process, a resolution schema and a resolution scenario;
   determining one or more destination nodes in the network based on the resolution process, resolution schema or resolution scenario;
   determining a pathway to the one or more destination nodes in the network based on the resolution process, resolution schema or resolution scenario;
   generating a resolution route for transmitting the request object in the network, the resolution route including the one or more destination nodes and the pathway to the one or more destination nodes;
   iteratively transmitting the request object to the one or more destination nodes in the network based on the resolution route;
   generating a destination node interface that includes a workflow inbox;
   receiving a request object resolution signal from a final destination node in the resolution route; and
   transmitting the request object resolution signal to the first node based on the request object resolution signal,
   wherein the destination node interface comprises a plurality of fields, including:
   a destination node add field that receives an instruction to add a destination node in the resolution route;
   a destination node escalation field that receives an instruction to escalate an authority level related to the one or more destination nodes in the resolution route; or
   a destination node replace field that receives an instruction to replace one of the one or more destination nodes in the resolution route with a new destination node.

2. The method in claim 1, wherein the final destination node is one of the one or more destination nodes.

3. The method in claim 1, the method further comprising:
   accessing a node determination rule; and
   dynamically evaluating the resolution route, including the one or more destination nodes and the pathway to the one or more destination nodes, in near-real-time based on the node determination rule.

4. The method in claim 3, the method further comprising: modifying the one or more destination nodes or the pathway to the one or more destination nodes in the resolution route.

5. The method in claim 1, wherein the request object resolution signal comprises a notification signal.

6. The method in claim 1, wherein request object resolution signal comprises an approval of an action request, a denial of an action request, a cancellation of the action request, or a reinitiation of the request object.

7. The method in claim 1, wherein the request object resolution signal is transmitted via an application callback exit.

8. The method in claim 1,
   wherein a rule scenario is determined based on a resolution policy stored in the database.

9. A method for generating a dynamically configurable resolution route for transmitting a request object to one or more nodes in a network, the method comprising:
   receiving a trigger signal from a first node in the network, the trigger signal being indicative of a request object being generated at the first node;
   querying a database in response to the trigger signal, and based on the request object, to access a resolution process, a resolution schema and a resolution scenario;
   determining one or more destination nodes in the network based on the resolution process, resolution schema or resolution scenario;
   determining a pathway to the one or more destination nodes in the network based on the resolution process, resolution schema or resolution scenario;
   generating a resolution route for transmitting the request object in the network, the resolution route including the one or more destination nodes and the pathway to the one or more destination nodes;
   iteratively transmitting the request object to the one or more destination nodes in the network based on the resolution route;
   generating a destination node interface that includes a workflow inbox;
   receiving a request object resolution signal from a final destination node in the resolution route; and
   transmitting the request object resolution signal to the first node based on the request object resolution signal,
   wherein the method further comprises:
   grouping the request object with one or more additional request objects;
   generating a request object group that includes the request object and the one or more additional request objects based on a resolution rule; and
   rendering the request object group in the workflow inbox.

10. The method in claim 1, wherein the destination node interface comprises a graphic user interface that includes a dynamic filter and a global search engine.

11. A system that generates a dynamically configurable resolution route for transmitting a request object in a network, the system comprising:
   a network interface;
   a database that stores a resolution policy, a resolution process, a resolution schema, or resolution scenario;
   a request object resolution unit that:
   receives a trigger signal from a first node in the network, the trigger signal being indicative of a request object being generated at the first node;
   queries the database in response to the trigger signal;
   determines one or more destination nodes in the network based on the resolution process, resolution schema or resolution scenario;
   determines a pathway to the one or more destination nodes in the network;
   generates a resolution route for transmitting the request object in the network, the resolution route including the one or more destination nodes and the pathway to the one or more destination nodes;
   iteratively transmits the request object to the one or more destination nodes in the network based on the resolution route;
   generates a destination node interface that includes a workflow inbox;

receives a request object resolution signal from a final destination node in the resolution route; and transmits the request object resolution signal to the first node based on the request object resolution signal, wherein the destination node interface comprises a plurality of fields, including:

a destination node add field that receives an instruction to add a destination node in the resolution route;

a destination node escalation field that receives an instruction to escalate an authority level related to the one or more destination nodes in the resolution route; or a destination node replace field that receives an instruction to replace one of the one or more destination nodes in the resolution route with a new destination node.

12. The system in claim 11, wherein the final destination node is one of the one or more destination nodes.

13. The system in claim 11, wherein the request object resolution unit accesses a node determination rule and dynamically evaluates the resolution route, including the one or more destination nodes and the pathway to the one or more destination nodes, in near-real-time based on the node determination rule.

14. The system in claim 11, wherein the request object resolution unit modifies the one or more destination nodes or the pathway to the one or more destination nodes in the resolution route.

15. The system in claim 11, wherein the request object resolution signal comprises a notification signal.

16. The system in claim 11, wherein request object resolution signal comprises an approval of an action request, a denial of an action request, a cancellation of the action request, or a reinitiation of the request object.

17. The system in claim 11, wherein the request object resolution unit includes an application callback exit that embeds logic received from one of the one or more destination nodes.

18. A system that generates a dynamically configurable resolution route for transmitting a request object in a network, the system comprising:

a network interface;

a database that stores a resolution policy, a resolution process, a resolution schema, or resolution scenario;

a request object resolution unit that:

receives a trigger signal from a first node in the network, the trigger signal being indicative of a request object being generated at the first node;

queries the database in response to the trigger signal:

determines one or more destination nodes in the network based on the resolution process, resolution schema or resolution scenario;

determines a pathway to the one or more destination nodes in the network:

generates a resolution route for transmitting the request object in the network, the resolution route including the one or more destination nodes and the pathway to the one or more destination nodes;

iteratively transmits the request object to the one or more destination nodes in the network based on the resolution route;

receives a request object resolution signal from a final destination node in the resolution route; and transmits the request object resolution signal to the first node based on the request object resolution signal, wherein the request object resolution unit is arranged to:

generate a destination node interface that includes a workflow inbox;

group the request object with one or more additional request objects;

generate a request object group that includes the request object and the one or more additional request objects based on a resolution rule; and render the request object group in the workflow inbox.

* * * * *